US012217568B2

(12) United States Patent
Narra et al.

(10) Patent No.: US 12,217,568 B2
(45) Date of Patent: Feb. 4, 2025

(54) TECHNICIAN INPUT-FREE RECONFIGURATION OF SECURED GAMING SYSTEM

(71) Applicant: AGS LLC, Las Vegas, NV (US)

(72) Inventors: Anil Kumar Narra, Alpharetta, GA (US); Jasonlee Kissee Hohman, Sparks, NV (US); Scott Andrew Melnick, Atlanta, GA (US)

(73) Assignee: AGS LLC, Las Vegas, NV (US)

( * ) Notice: Subject to any disclaimer, the term of this patent is extended or adjusted under 35 U.S.C. 154(b) by 704 days.

(21) Appl. No.: 17/176,946

(22) Filed: Feb. 16, 2021

(65) Prior Publication Data

US 2021/0201624 A1 Jul. 1, 2021

Related U.S. Application Data

(63) Continuation of application No. 16/354,723, filed on Mar. 15, 2019, now Pat. No. 10,957,153.

(51) Int. Cl.
*G07F 17/00* (2006.01)
*G07F 17/32* (2006.01)

(52) U.S. Cl.
CPC ...... *G07F 17/3241* (2013.01); *G07F 17/3216* (2013.01); *G07F 17/3223* (2013.01)

(58) Field of Classification Search
None
See application file for complete search history.

(56) References Cited

U.S. PATENT DOCUMENTS

| | | | |
|---|---|---|---|
| 4,861,041 | A | 8/1989 | Jones et al. |
| 5,042,810 | A | 8/1991 | Williams |

(Continued)

FOREIGN PATENT DOCUMENTS

| | | |
|---|---|---|
| AU | 589158 | 10/1989 |
| AU | 655801 | 1/1995 |
| AU | 2002314959 | 2/2008 |

OTHER PUBLICATIONS

Lightning Link, screen shots 1 through 3, http://www.aristocrat-us.com/lightning-link.

(Continued)

*Primary Examiner* — Paul A D'Agostino
(74) *Attorney, Agent, or Firm* — WEIDE & MILLER, LTD.

(57) ABSTRACT

A progressive pool controller within a gaming environment can have programmable contents thereof retrieved or changed without need for user interaction with the controller other than inserting a dynamically-linkable and reprogrammable storage device (e.g., a USB flash drive) into an I/O receptacle of the controller. The controller has a service automatically repeatedly executing therein, checking for insertion of the storage device, checking for recognizable commands within the inserted storage device after it is inserted, executing command following programs for the recognizable commands, saving output results of the executed programs into the inserted storage device and signaling that the storage device should be removed from the I/O receptacle upon completed execution of all the command following programs. Contents of the storage device remain encrypted when in transit and are exposed within secured confines of the controller.

16 Claims, 14 Drawing Sheets

(56) References Cited

U.S. PATENT DOCUMENTS 5,116,055 A 5/1992 Tracy
5,280,909 A 1/1994 Tracy
5,344,144 A 9/1994 Canon
5,393,097 A 2/1995 Townsend
5,655,961 A 8/1997 Acres et al.
5,836,818 A 11/1998 Jones et al.
5,851,147 A 12/1998 Stupak et al.
5,851,149 A 12/1998 Xidos et al.
5,876,284 A 3/1999 Acres et al.
6,110,043 A 8/2000 Olsen
6,146,273 A 11/2000 Olsen
6,203,430 B1 3/2001 Walker et al.
6,210,275 B1 4/2001 Olsen
6,217,448 B1 4/2001 Olsen
6,231,445 B1 5/2001 Acres
6,241,608 B1 6/2001 Torango
6,315,660 B1 11/2001 DeMar et al.
6,336,148 B1 1/2002 Doong
6,663,487 B1 12/2003 Ladner
6,899,627 B2 * 5/2005 Lam ........................ G07F 17/32 463/16
6,939,224 B2 9/2005 Palmer et al.
7,056,215 B1 6/2006 Olive
7,252,590 B2 8/2007 Palmer et al.
7,337,330 B2 2/2008 Gatto et al.
7,338,372 B2 * 3/2008 Morrow ................ G07F 17/323 463/31
7,651,394 B2 1/2010 Johnson
7,686,688 B2 3/2010 Friedman et al.
7,892,085 B2 2/2011 Harris
7,896,741 B2 3/2011 Kuehling et al.
7,931,532 B2 4/2011 Johnson
7,934,993 B2 5/2011 Kuehling et al.
8,257,161 B2 9/2012 Louie et al.
8,262,459 B2 9/2012 Mattice et al.
8,371,927 B2 2/2013 Englman
8,414,402 B2 4/2013 LeMay et al.
8,568,224 B1 * 10/2013 Itkis .................... G07F 17/3223 463/16
8,579,704 B2 11/2013 Torres
8,740,692 B2 6/2014 Yoseloff et al.
9,033,793 B2 5/2015 Torres
9,161,325 B1 * 10/2015 Urbanek ................. H04W 4/50
9,342,956 B2 5/2016 Hughes
9,442,752 B1 * 9/2016 Roth ................... G06F 9/45558
9,452,350 B1 9/2016 Henrick
9,508,219 B2 11/2016 Garvey et al.
9,524,606 B1 12/2016 Stasi
9,824,531 B2 11/2017 Iyer et al.
10,320,612 B2 6/2019 Kelly
2002/0137217 A1 9/2002 Rowe
2003/0008708 A1 1/2003 Suchocki et al.
2004/0198494 A1 * 10/2004 Nguyen .............. G07F 17/3202 463/42
2004/0254006 A1 12/2004 Lam
2004/0254013 A1 * 12/2004 Quraishi ............. G07F 17/3202 463/29
2004/0254014 A1 12/2004 Quraishi
2005/0077995 A1 * 4/2005 Paulsen .................. G07C 9/257 340/5.6
2005/0227771 A1 10/2005 Nelson et al.
2006/0247020 A1 * 11/2006 Fujimori ............. G07F 17/3202 463/20
2007/0105628 A1 5/2007 Arbogast
2007/0155204 A1 7/2007 Klitsner
2007/0191090 A1 * 8/2007 O'Halloran ......... G07F 17/3269 463/20
2008/0015015 A1 1/2008 Walker
2008/0141381 A1 * 6/2008 Walkoe ................. G06F 21/109 726/28
2009/0132698 A1 5/2009 Barnhill, Jr.
2009/0233709 A1 * 9/2009 Falvey .................... G07F 17/32 463/29
2009/0247293 A1 * 10/2009 Lenger .................. G07F 17/323 463/43
2010/0105454 A1 * 4/2010 Weber ..................... G07F 17/32 463/1
2010/0176916 A1 * 7/2010 Baucom ................... G07C 9/27 340/5.5
2010/0180272 A1 * 7/2010 Kettler ...................... G06F 8/60 705/26.1
2010/0227680 A1 * 9/2010 Leopold .................. G07F 17/32 463/29
2012/0084438 A1 * 4/2012 Raleigh ............... H04L 63/1425 709/224
2013/0084932 A1 4/2013 Nelson
2013/0116032 A1 5/2013 Lutnick
2013/0344941 A1 * 12/2013 Nelson ................ G07F 17/3244 463/25
2014/0018146 A1 1/2014 Zielinski et al.
2014/0075567 A1 * 3/2014 Raleigh .............. G06Q 30/0283 726/26
2014/0087849 A1 3/2014 Page
2014/0221071 A1 * 8/2014 Calio .................. G07F 17/3225 463/31
2014/0353983 A1 * 12/2014 Vetter ..................... E05C 3/042 292/197
2014/0380015 A1 * 12/2014 Lasser ................... G06F 12/023 711/170
2015/0087369 A1 * 3/2015 McIntyre ............ G07F 17/3218 463/31
2015/0087396 A1 * 3/2015 Norris ................. G07F 17/3244 463/25
2015/0161853 A1 6/2015 Ryan
2015/0169228 A1 * 6/2015 Sivasankaran ........ G06F 3/0659 711/103
2015/0220381 A1 8/2015 Horgan
2016/0012465 A1 1/2016 Sharp
2016/0027243 A1 * 1/2016 Solaja ................. G07F 17/3223 463/31
2016/0110947 A1 4/2016 Eisenmann et al.
2016/0180656 A1 * 6/2016 Loose ................. G07F 17/3209 463/20
2017/0065894 A1 3/2017 Woog
2017/0078922 A1 3/2017 Raleigh
2017/0147526 A1 5/2017 Chen
2017/0236371 A1 * 8/2017 Froelich .............. G07F 17/3241 463/17
2018/0219901 A1 8/2018 Gordissky
2018/0225230 A1 * 8/2018 Litichever ............... G06F 21/82
2018/0307458 A1 10/2018 Daman
2019/0272705 A1 9/2019 Ruiz

OTHER PUBLICATIONS

Buffalo Gold, screen shots 1 and 2, http://www.aristocrat-us.com/buffalo-gold.
So Hot Bonus Choice, screen shots 1 and 2, http://www.youtube.com/watch?v=4-IZuyCmTuE.
Restriction Requirement mailed Jul. 16, 2020 in U.S. Appl. No. 16/354,723.
Amendment mailed Jul. 27, 2020 in U.S. Appl. No. 16/354,723.
Non-Final Rejection mailed Aug. 27, 2020 in U.S. Appl. No. 16/354,723.
Amendment mailed Oct. 8, 2020 in U.S. Appl. No. 16/354,723.
Notice of Allowance and Fees Due mailed Nov. 17, 2020 in U.S. Appl. No. 16/354,723.

* cited by examiner

COMMAND LOAD AND EXECUTE PROCEDURE 401

TECHNICIAN INPUT-FREE RECONFIGURATION OF SECURED GAMING SYSTEM

This application is a continuation of and claims benefit of U.S. patent application Ser. No. 16/354,723, filed Mar. 15, 2019 and originally entitled "TECHNICIAN INPUT-FREE RECONFIGURATION OF SECURED GAMING SYSTEM" where said application early published as US 2020/0294353 on Sep. 17, 2020 and where the disclosure of said application is incorporated herein by reference in its entirety.

TECHNICAL FIELD

The present disclosure relates to operations of a gaming machine within a gaming environment.

BACKGROUND

Slot-type electronic and/or mechanical gaming machines, often also referred as slot machines, are popular fixtures in casino or other gaming environments. Such slot machines are generally controlled by installed software programs. Aside from slot machines, various other kinds of gaming devices, including electronically-assisted gaming tables are also generally controlled by installed software programs. Generally, the installed software programs are stored in secured memory devices housed in secured cabinets and executed by secured processors and/or other programmable hardware also housed in the secured cabinets. Retrieval and modification of the data of the secured memory devices and of the secured processors and/or other secured programmable hardware by remote reach from remote locations is not permitted for reasons of maintaining tight security and auditing of all actions taken by the electronics in the gaming machines.

Various types of people are provided with different degrees of access to the gaming machines. Participants in gaming environments may include one or more primary players who are directly using the slot or other software driven gaming apparatuses by engaging with external user inputs (e.g., buttons, touch screens) as well as one or more locally adjacent players who are similarly directly using locally adjacent slot or other software driven gaming apparatuses. The participants may include in-casino further players who are participating in an in-casino progressive jackpot pool, wide area players who are participating in a state sanctioned wide area progressive jackpot pool, adjacent bystanders (e.g., players' friends) who are standing nearby the primary players and nearby passers-by who happen to be passing by in an area where they can view part of the gaming action(s) of one or more of the slot or other software driven gaming apparatuses including displays of the progressively growing local or other area jackpot pools and the occasional awarding of such jackpots. The casino floor typically also has authorized agents of the casino (authorized operators) who patrol the floor and help with problems that cannot be automatically dealt with and instead required hands-on access to the gaming machines and/or their automated controllers.

One type of prior art automated controller is the progressive pool automated controller (PPAC). The playing of respective progressive pool games is typically controlled by respective progressive pool automated controllers (PPAC's). Such PPAC's (also referred to herein as PCtrlr's) have to be highly secured due to the large amounts of monetary payouts normally handled by these controllers. Typically, the PPAC is securely enclosed between a bank of electronic gaming machines (EGM's) that are participating in a respective pool managed by that PPAC. On occasion, the PPAC's need to be reconfigured. This can present a challenge due to the security measures that apply to each PPAC. As noted, retrieval and/or modification of data of the secured memory devices and of the secured processors and/or other secured programmable hardware in devices such as PPAC's by way of remote reach from remote locations is not permitted for reasons of maintaining tight security and auditing of all actions taken by the electronics in the gaming machines. Thus an authorized operator must be dispatched to the devices to carry out any desired retrieval and/or modification of data. This can be expensive and time consuming.

Slot machines may use mechanical reels or wheels and/or video reels or wheels to present both action during development of a game outcome and a finalized outcome of a slot game to a corresponding one or more players. Typically, before each gaming action by the machine (e.g., spinning of the reels or wheels), the player is required to ante up by placing at least one wager on the outcome of the gaming action. In some games, a player can elect to have part of one of his/her wagers contributed to a progressive jackpot pool. Excitement grows as the size of the progressive jackpot pool reaches relatively large values. Chances for winning the progressive jackpot pool can come in various software mediated ways. For example, the player may select or define (or may have automatically pre-determined for the player) a line, pattern or other set of symbol spots that will operate as an actively-wagered upon pay line or pattern along which, game-generated randomly distributed symbols are evaluated to determine if a winning combination is present (e.g., a sequence defining combination such Jack, Queen, King, Ace, etc. cards, hereafter also J, Q, K, A). If the actively-wagered upon pay line or pattern provides a winning combination, the player is rewarded (e.g., monetarily and/or otherwise). Various outcome enhancing symbols such as wild symbols can appear on the reels or wheels of the game. Wild symbols typically serve as outcome enhancing substitutes for symbols needed to form a winning combination. In various prior art games, wild symbols: (1) can come into existence by other symbols individually morphing into wild symbols; (2) they can be individually copied from one reel or wheel to another; (3) they can be dropped from an animated character (e.g., cartoon) onto the reels or wheels to individually change certain existing symbols on a scatter distributed basis; and (4) they can populate a reel or wheel more frequently during so-called, free spins. On occasions, a player may be awarded with a wheel spin that gives the player a crack at the progressive jackpot pool. Due to such occasional sprinklings of a chance of winning the progressive jackpot pool, the primary players and adjacent other persons may experience various emotional responses and derive entertainment value from not only the unique ways in which various games are played and game outcomes are developed but also from the chance of winning the progressive jackpot pool.

Because sizes of progressive jackpot pools can be substantial, state and/or other government entities take interest in assuring that the progressive jackpot pools are run in fair and verifiable ways and pool awards are reported for taxation purposes. Casinos also take keen interest in assuring that the progressive jackpot pools are run in fair and verifiable way because the casinos can incur substantial losses if there is a compromise to the security and/or fairness aspects of the gaming actions carried out by their slot or other software driven gaming apparatuses.

One prior art method by way of which some jurisdictions assure fairness of operation of slot or other software driven gaming apparatuses is through GLI-21 (Gaming Laboratories International Client-Server Certification Standards) where a currently in force version of the certification process is Version 2.2 (released Sep. 6, 2011). Briefly according to the GLI-21 specification, a certain type of hash known as SHA-1 (Secure Hash Algorithm 1—specified by the US National Security Agency) is taken of various software code fragments as they are installed into respective servers that drive the slot or other software driven gaming apparatuses after the fairness of the software has been ascertained by a government approved testing institution. A GLI-certification letter is generated setting forth the hash results. Thereafter, a government agent may test any of the slot or other software driven gaming apparatuses for compliance with the GLI-certification letter (to verify that any sampled or all gaming action driving programs produced the same hash values at program launch time). Use of SHA-1 hashes for security purposes is also disclosed in Patel U.S. Pat. No. 8,900,054 (Dec. 2, 2014). Patel discloses that software packages added to a software library may be verified from package data using an MD5 or SHA-1 or some other verification tool. According to Patel, the verification string may be added to a package header and used to re-verify the package after it is downloaded to the EGM 213. All verification failures and related errors may be logged, and the log entry may contain the date and time, the ID of the person running the process at the time, and the specific type of error that occurred. According to Patel: A build package utility is used to generate download packages, and a package installed utility is supplied on the EGM to install downloaded packages. Both of these perform necessary compression and decompression as well as the data integrity checks of the contents of the package. The package builder utility calculates a SHA-1 hash value over the entire data contents of the package. This is then stored in the package header and is used by the package receiver and installed on the EGM to validate the contents of the package. The package will not be installed on the EGM unless it passes this SHA-1 validation.

If a PPAC (Progressive Pool Automated Controller) needs to be reconfigured, the conventional prior art approach calls for a highly skilled technician to be dispatched onto the casino floor with an assortment of security keys and technical tools such as monitors, keypads, technical-assist computer and disk drives. The technician has to open up the secured PPAC housing, halt play on all the associated gaming machines (EGM's) and then engage in a cumbersome log-in procedure (for security's sake) before undertaking a long and complex process of hooking in the technical tools and navigating through reconfiguration and validation menus in order to successfully complete a desired reconfiguration.

One prior art method for reconfiguring a progressive controller by dispatching a human operator to the controller is disclosed in Kuehling U.S. Pat. No. 7,896,741 issued Mar. 1, 2011. According to the Kuehling method, a technician must unplug a run key (e.g., in the form of a USB drive) from the controller in order to halt the progressive gaming supported thereby and then insert a programming key (e.g., also in the form of a USB drive). The programming key in combination with a computer that is also attached to the controller allows the technician to step through one or more progressive controller parameter modification options that comprise displaying one or more menu options for software configuration.

There are several drawbacks to the Kuehling method. The technician who performs the reconfiguration process must be trained to understand the menu options presented by the software and to input the correct choices by way of the attached computer. It takes time for the trained technician to travel from the production shop at which the reconfiguration is designed to the site of the casino and then back again. It takes time for the trained technician to attach his/her assortment of technical tools (e.g., monitors, keypads, etc.) to the progressive controller, to log in and to step through all the reconfiguration menus and options. All the while the associated gaming machines (EGM's) are nonoperational and the casino may be losing money as well as customer good will (because players are locked out from playing on their favorite machines). It would be desirable to have a simpler, faster method of securely reconfiguring progressive controllers.

It is to be understood that some concepts and ideas provided in this description of the Background may be novel rather than part of the prior art.

SUMMARY

Various embodiments in accordance with the present disclosure generally relate to simplification in retrieving and/or updating of programmable contents or configurations of secured gaming controllers. More specifically, a progressive controller within a gaming environment can have security-requiring programmable contents or configurations thereof retrieved or changed without need for user interaction with the controller other than that of inserting a dynamically-linkable and reprogrammable storage device (e.g., a USB flash drive) into an I/O receptacle of the controller. The controller has a Tech-Assist service (TA-service) installed into it from a non-transitory computer-readable storage apparatus where the TA-service automatically repeatedly executes on one or more processors of the controller and checks for insertion of the storage device, checks for recognizable TA-commands within the inserted storage device after it is inserted, causes execution of command-following (or obeying) programs of the recognizable TA-commands by one or more of the processors of the controller, saves output results of the executed TA-command following programs into the inserted storage device and signals that the storage device should be removed from the I/O receptacle upon completed execution of all the TA-command following programs. In one embodiment, contents of the storage device (e.g., the USB flash drive) remain encrypted when in transit. Plaintext versions of the encrypted contents are exposed only within secured confines of the controller or while within confines of a secure authorized code production and/or analysis shop.

In one embodiment, a method is provided for retrieving and/or updating programmable contents or configurations of a secured gaming controller where the method comprises: automatically repeatedly running a Tech-Assist service (TA-service) in the controller where the running TA-service (a) checks for insertion of a dynamically-linkable and reprogrammable storage device into an I/O receptacle of the controller; (b) the TA-service checks for presence of recognizable TA-commands within the inserted storage device after it is inserted, (c) the TA-service forms and executes the command following programs (TA-programs) of the recognizable TA-commands, where at least one of the executed TA-programs causes retrieval or updating of programmable contents or reconfigurable configurations of the controller; (d) the TA-service saves output results of executed ones of the TA-programs into the inserted storage device and (e) TA-service signals that the storage device can be removed from the I/O receptacle upon completed execution of all the TA-programs in the in the inserted storage device. In one embodiment, contents of the dynamically-linkable and reprogrammable storage device (e.g., a USB Flash device) remain encrypted while the storage device is outside secured confines of the controller or outside secured confines of an authorized code production and/or analysis shop.

Other aspects of the present disclosure will become apparent from the below detailed descriptions.

BRIEF DESCRIPTION OF DRAWINGS

The present disclosure may be better understood by reference to the following detailed description taken in conjunction with the accompanying drawings, which illustrate particular embodiments in accordance with the present disclosure.

DETAILED DESCRIPTION

Figure 1:
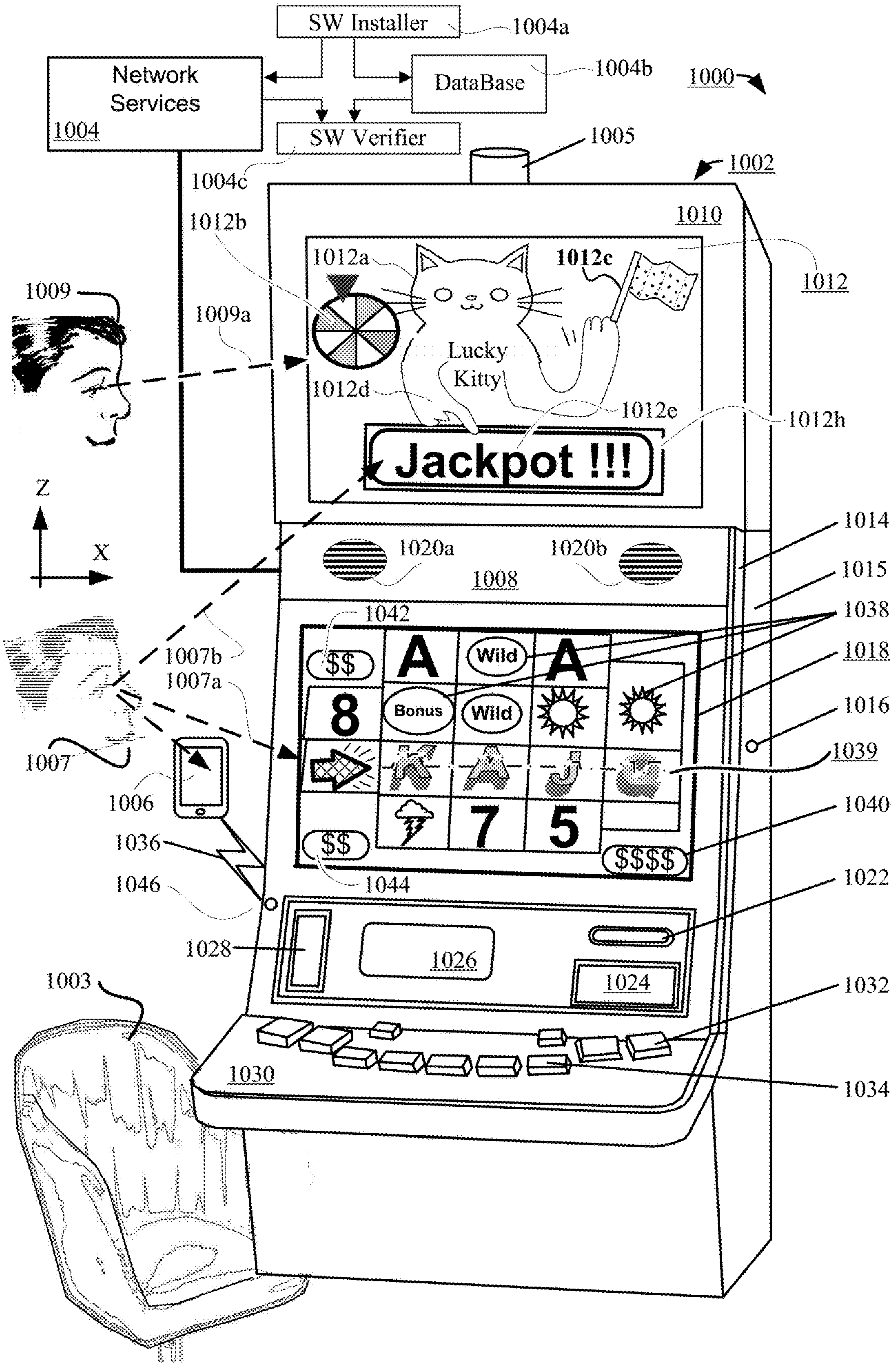
FIG. 1 illustrates a gaming system and environment including a wager-based gaming machine in accordance with the present disclosure.

Reference will now be made in detail to some specific embodiments in accordance with the present disclosure. While the present disclosure is described in conjunction with these specific embodiments, it will be understood that it is not intended to limit the teachings of the present disclosure to the described embodiments. On the contrary, it is intended to cover alternatives, modifications, and equivalents as may be included within the spirit and scope of the teachings of the present disclosure.

In the following description, numerous specific details are set forth in order to provide a thorough understanding of the present disclosure. Particular embodiments may be implemented without some or all of these specific details. In other instances, well known process operations have not been described in detail in order not to unnecessarily obscure the present disclosure. Although not explicitly shown in many of the diagrams, it is to be understood that the various automated mechanisms discussed herein typically include at least one data processing unit such as a central processing unit (CPU) where multicore and other parallel processing architectures may additionally or alternatively be used. It is to be further understood that the various automated mechanisms typically include or are operatively coupled to different kinds of non-transient storage mechanisms including high speed caches (which could be on-chip, package secured caches), high speed DRAM and/or SRAM, nonvolatile Flash or other such nonvolatile random access and/or sequential access storage devices, magnetic, optical and/or magneto-optical storage devices and so on. The various data processing mechanisms and data storage mechanisms may be operatively intercoupled by way of local buses and/or other communication fabrics where the latter may include wireless as well as wired communication fabrics.

In general, gaming systems which provide wager-based games are described. In particular, with respect to FIGS. 1 and 2, a gaming machine system including a plurality of automated wager-based gaming machines in communication with network devices is described. The gaming machine system can support wager-based games where a progressively growing prize or award is made possible and/or where the unleashing of a whole series of bonuses or other awards is made possible. Although not indicated in FIGS. 1-2, one of the mandates of operating a secure gaming system is that direct remote reconfiguration of the gaming machines (EGM's e.g., 1002) and their associated in-casino network controllers (e.g., 1004) is not permitted at least for certain classes of wager-based games (e.g., Class III games) and/or in certain jurisdictions or certain gaming organizations. Reconfiguration often requires that an authorized human being open a secured housing (e.g., with an allocated mechanical key) and perform the reconfiguration (with aid of an electronic security key and entry of appropriate passwords) while in plain sight on the casino floor so that such activities can be monitored and audited by casino security teams. These requirements can make the reconfiguration process cumbersome, time consuming and expensive.

FIG. 1 illustrates part of an automated gaming system 1000 in accordance with the disclosure that includes a wager-based gaming machine 1002 (e.g., a slot machine). The wager-based gaming machine 1002 can include wireless or wired communication interfaces which allow communications with remote servers and/or other devices including a remote services providing network 1004 (e.g., having service providing servers and/or other data storing, communicating and data processing units—not explicitly shown). However, as noted above, direct remote reconfiguration of the gaming machines (e.g., 1002) and their associated in-casino network controllers (e.g., 1004) is not permitted at least in certain circumstances and instead it must be done with presence of an authorized on-site person. The services providing network 1004 can provide privacy/integrity-secured services such as but not limited to player tracking and progressive gaming. (Some specific network services are described in more detail in conjunction with FIG. 2). The player tracking service can be part of a slot accounting system that for example keeps track of each player's winnings and expenditures (including, in some embodiments, player contributions to one or more progressive jackpot pools). In addition, the gaming machine 1002 can include wireless communication interfaces, such as a wireless interface 1046 (internal, not specifically shown) which allow communication with one or more mobile devices, such as a mobile phone 1006 (only one shown), a tablet computer, a laptop computer and so on via respective wireless connections such as 1036. The wireless interface 1046 can employ various electronic, optical or other electromagnetic wireless and secured or non-secured communication protocols, including for example TCP/IP, UDP/IP, Bluetooth™ or Wi-Fi.

The respective mobile phones (e.g., 1006) and/or tablet computers and/or other mobile devices can be owned and/or utilized by various players, potential customers, authorized casino operators or authorized gaming inspectors. A mobile device carried by a primary player (e.g., 1007) can be configured to perform gaming related functions, such as functions associated with transferring funds to or from the specific gaming machine 1002 and the primary player's account(s) or functions related to player tracking. A mobile device carried by a casino operator can be configured to perform operator related functions, such as performing hand pays, responding to tilt conditions or collecting metering related information. A mobile device carried by an authorized gaming inspector can be configured to perform inspection related functions, such as actuating software verification procedures.

Use of mobile devices is not limited to secured transactions. In one embodiment, mobile devices may be used for social networking. For example, a primary player 1007 may authorize his/her mobile device (e.g., 1006) to automatically interact with a currently used gaming machine 1002 for the purpose of automatically posting to a user-chosen social network various announcements such as, but not limited to, that the primary player 1007 has been having fun playing the Lucky Kitty game (a fictitious name for purposes herein) for X hours at the given gaming establishment or that the Lucky Kitty game has just awarded the primary player 1007 a symbols upgrade that now gives that player an opportunity to spin for a jackpot and/or other awards. The primary player 1007 may alternatively or additionally authorize his/her mobile device (e.g., 1006) to automatically announce (wirelessly) to a selected group of friends or associates that player 1007 has just been awarded an opportunity to spin for a jackpot and/or other awards and inviting them to stop by and watch the fun (e.g., as nearby other person 1009 is doing over the shoulder of the primary player 1007, where the latter in one embodiment, is seated in chair 1003 situated in front of gaming machine 1002.)

According to the same or an alternate embodiment, the primary player 1007 may use his/her mobile device (e.g., 1006) to temporarily reserve the particular gaming machine 1002 for a predetermined amount of time (e.g., no more than say 10 to 30 minutes) so that the primary player may temporarily step away to attend to various needs. While the primary player 1007 is temporarily away, the gaming machine 1002 may display a reservation notice saying for example, "This machine is reserved for the next MM minutes by a winning player who was recently awarded a lucky opportunity to spin for a jackpot and/or other awards. Stand by and watch for more such lucky opportunities!" (where here MM is a progressively decreasing time counter). The reservation notice may be prominently posted on an upper display 1012 of the gaming machine 1002 as shall next be described.

The gaming machine 1002 can include a mechanically-lockable base cabinet 1008 and an upper or top box 1010 fixedly mounted above the cabinet. The top box 1010 includes an upper display 1012. The upper display 1012 can be used to display video content, such as game art associated with the game being currently played on the gaming machine 1002. For example, the game art can include one or more animated wheels or reels (or other chance/opportunity indicating mechanisms) and/or one or more animated creatures (e.g., the flag waving Lucky Kitty illustrated at 1012*a*). The animated wheels or reels (e.g., virtual wheel 1012*b*) can be configured to spin and to stop to reveal an occasional opportunity to spin for a jackpot and/or other awards and/or the awarding of a grand prize such as a progressive jackpot 1012*e*. In one embodiment, the predetermined stoppage position or area or awarding of a substantially large prize (e.g., jackpot 1012*e*) may be pointed to by an animated finger 1012*d* of the Lucky Kitty character 1012*a* (or other appropriate animated figure). In one embodiment, a free other hand of the character may wave or otherwise gesture to attract attention to the current selection of an upcoming opportunity to spin for a jackpot and/or other awards and/or the actual awarding of a grand prize such as a progressive jackpot 1012*e*. The Lucky Kitty character 1012*a* (or other appropriate animated figure) may wave an attention getting flag 1012*c*, or a virtual fireworks sparkler, etc. at the appropriate times. At other times and/or in other examples, the video content of the upper display 1012 can include advertisements and promotions, such as for example, "A jackpot amount of more than $100,000 was awarded on this machine two weeks ago. Is this a lucky machine for you too?"

In accordance with an aspect of the present disclosure, security measures are automatically and repeatedly taken to assure that only approved software programs are installed and run on or for the slot or other software driven gaming apparatuses. Briefly and for sake of introduction, a gaming control program (e.g., one composed of executable code and control data) may be installed into the network services block 1004 by a software driven installer 1004*a* that is brought on-site by an authorized technician. At the time of installation, the installer 1004*a* also stores software verification data into database 1004*b*. Later when the installed gaming control program is called on, but before it execution proceeds, a software driven verifier 1004*c* automatically accesses the stored verification data in the database 1004*b* and uses it to verify that the called upon program is the same as the originally installed program. This should prevent software hackers from maliciously introducing unapproved gaming control code into the network services block 1004 with the aim for example, of causing a jackpot to be awarded to them themselves or to their associates.

Returning first to a further description of FIG. 1, in alternate embodiments, the top box 1010 can include one or more mechanical and/or electronic devices in addition to the upper video display 1012. For example, mechanical devices, such as one or more mechanical wheels can be mounted to or within the top box 1010. The mechanical wheel(s) can include markings that indicate various bonus award situations and/or situations where large jackpots might be won. The wheel(s) can be spun and stopped at particular stopping points to reveal a bonus award situation or a multi-symbol transformation situation (e.g., awarding multiple wild cards, where the latter can increase the chance for winning a jackpot 1012*e*). In yet other embodiments, the top box 1010 can include a plurality of upper displays that provide similar functions. With respect to chance providing mechanisms as described herein, it is to be understood that such can include not only mechanical chance providing mechanisms (e.g., mechanical spinning wheel with relatively unpredictable stop position), but also electronically based chance providing mechanisms that can be implemented in the form of digital and/or analog electronic circuits. Such circuits may rely on flip-flops or registers designed with intentional meta-stability and/or on noise intolerant switching circuits that are intentionally exposed to random noise (e.g., thermal noise) so as to provide relatively random and unpredictable outcomes. In one embodiment, one of the tasks of a described code/data verifier is to verify that utilized software and control data use pre-approved hardware, firmware and/or software for properly providing random chances of respective predetermined probabilities at winning and or getting a chance to spin for respective prizes including for a progressive jackpot pool.

It will be appreciated by those familiar with gaming environments that participants in various gaming environments (also briefly see FIG. 2) include respective primary players like 1007 who are directly using their respective slot machines (e.g., 1002) and are each typically seated on a chair (e.g., 1003) disposed in front of the gaming machine so as to thereby position that primary player's eyes substantially level with a central vertical position (along the vertical Z axis) with a primary game outcome display area 1018 of the gaming machine 1002 thus allowing for a comfortable gaze angle indicated by viewing vector 1007*a*. The primary game outcome display area 1018 typically being positioned vertically below and slightly spaced apart from the upper video display area 1012. The vertical elevation of the upper video display area 1012 is chosen so as to be easily viewed by adjacent player(s) who is/are directly using adjacent slot machines (for example at an eye incline angle shown as viewing vector 1007*b*) and also to be easily viewed by adjacent bystanders 1009 (e.g., a player's friends) who are standing nearby the primary player or nearby one of the adjacent players or are nearby passers by who happen to be passing by in an area where they can view part of the gaming action(s) of one or more of the slot machines; and in particular the actions displayed by the upper video display 1012 at a comfortable viewing vector 1009*a*. Due to real or simulated movements of the mechanical reels and/or video reels in the primary game outcome display area 1018 and in the upper video display area 1012, the primary players and the adjacent other persons may experience various emotional responses and derive entertainment value and expectations for further excitement from the unique ways in which the slot game (e.g., the Lucky Kitty game illustrated as an example in areas 1012 and 1018 or other such software driven gaming actions) are progressing. For example, when a low frequency winning hand appears on a wagered-for pay line such as 1039, attention grabbing other symbols (e.g., flashing arrow noted by gaze line 1007*a*) may be automatically presented on the gaming machine. In accordance with one aspect of the present disclosure, before the primary player 1007 spins for the jackpot (e.g., using virtual wheel 1012*b*), attention grabbing further and larger displays appear on the upper video display 1012 (e.g., "Big Win Possible Here!"—not shown) so they are in the line of sight 1009*a* of bystanders or other primary players. This can increase emotional levels of all involved and heightened enjoyment of the gaming actions. In other words, a mixture of emotions may be created of both heightened expectations and foreboding that all the expected rewards may or may not be realized. If the primary player 1007 continues to win low frequency winning hands such as the King, Ace, Jack, Queen poker hand (K, A, J, Q) shown on line 1039, the expectations for jackpot or like big payouts can increase, thus providing increased entertainment and excitement to those nearby the gaming machine 1002 (and optionally to those on social media who are following the primary player's progress). This crowd based level of built-up excitement can be brought to a sudden halt and crash if a progressive pool controller (PPAC) has to be halted and reconfigured over a relatively long duration (e.g., more than 5 minutes).

Still referring to FIG. 1 and in terms of yet further details for one embodiment, the base cabinet 1008 includes an internal access entry mechanism instantiated for example as door 1014. The door 1014 swings outward and is coupled to a back portion 1015. The door 1014 includes a locking mechanism 1016. During normal operation, the door 1014 is locked. Typically, unlocking the door 1016 causes the gaming machine 1002 to enter a tilt mode where gaming functions, such as the play of a wager-based game, are not available. This tilt mode can be referred to as a hard tilt.

The cabinet 1008 can include a number of apertures that allow access to portions of a number of devices which are mounted within the cabinet. These gaming devices can include, but are not limited to displays such as 1018 and 1026, speakers such as 1020*a* and 1020*b*, a printer 1022, a bill acceptor 1024, a magnetic and/or chipped card reader 1028 and a resting shelf and/or button panel 1030 including buttons 1032 and 1034. As described in more detail below, these gaming devices can be used to generate wager-based game play on the gaming machine 1002.

In particular embodiments, the bill acceptor 1024 can be used to accept currency or a printed ticket which can be used to deposit credits into an account maintained for the primary player 1007 and/or the gaming machine 1002. The credits can be used for wagers. The printer 1022 can be used to print tickets to transfer credits from one gaming machine (e.g., 1002) to another or to monetize accumulated credits. Typically, the tickets can be redeemed for cash or additional game play, such as game play on another gaming machine or at a gaming table.

Figure 2:
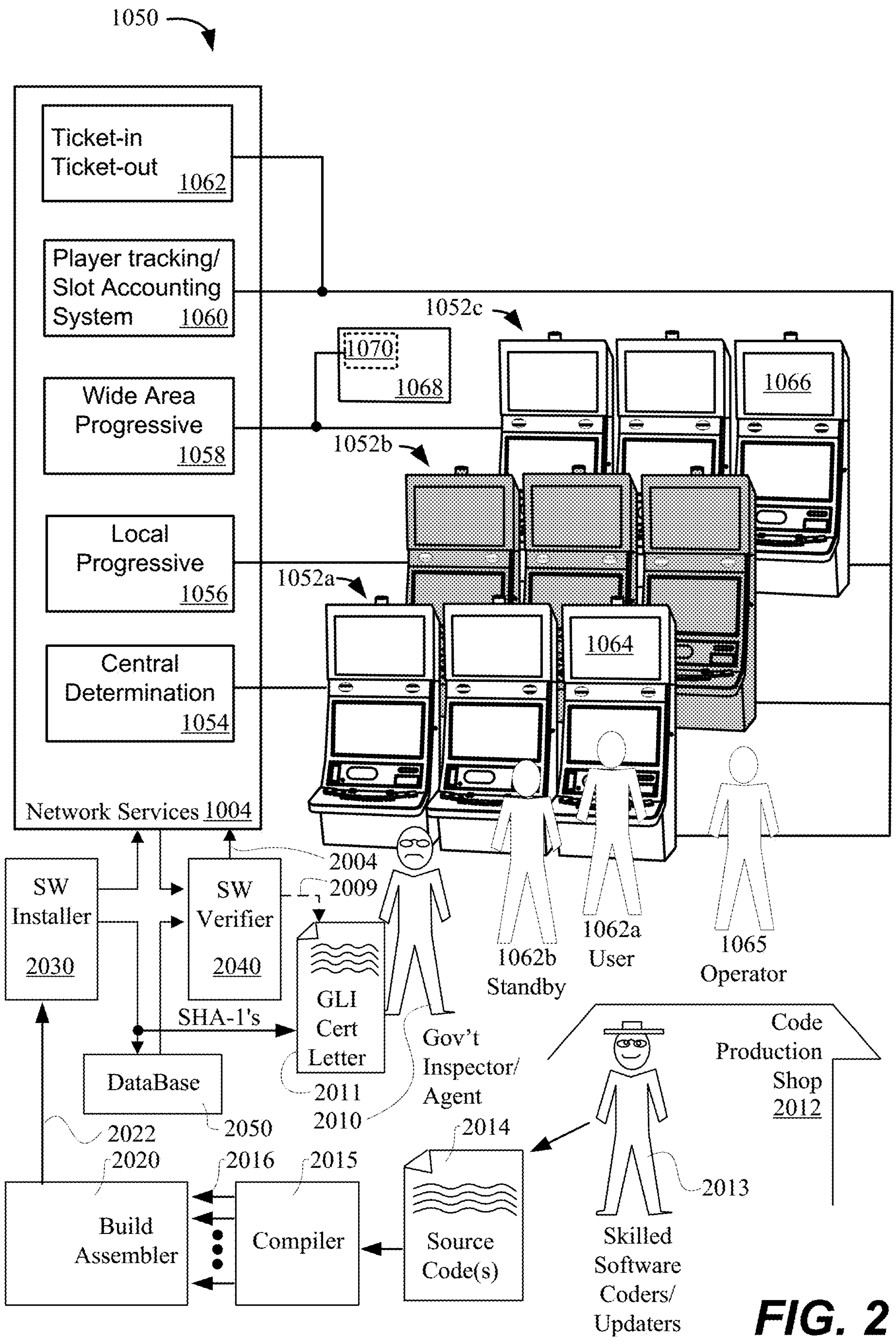
FIG. 2 illustrates a gaming system including three banks of gaming machines that may participate in a progressive jackpot pool.

The bill acceptor 1024 and printer 1022 printer can be part of ticket-in/ticket-out (TITO) system 1062 illustrated in FIG. 2. The TITO system 1062 can be included as one of the secured services provided by the services network 1004. The TITO system allows a ticket printed at a first gaming machine with a credit amount to be inserted into a bill acceptor at a second gaming machine and validated for game play. After validation, the credit amount associated with the ticket can be made available for game play on the second gaming machine. Additional details of the TITO system 1062 are described below in conjunction with FIG. 2.

The bill acceptor 1024 can include a slot surrounded by a bezel which allows banknotes of various denominations or printed tickets to be inserted into the bill acceptor. The bill acceptor 1024 can include sensors for reading information from the banknotes and determining whether the banknotes inserted through the slot are valid. Banknotes determined to be invalid, such as damaged or counterfeit notes, can be automatically ejected from the bill acceptor 1024. In some instances, the bill acceptor 1024 can include upgradeable firmware and a connection to additional network services. Via the network connection, new firmware, such as new counterfeit detection algorithms can be downloaded for installation into the bill acceptor 1024.

The bill acceptor 1024 includes mechanisms for guiding the banknotes or printed tickets past the internal sensors. Banknotes or printed tickets which are accepted can be guided to a bill stacker (not shown) located within the cabinet 1008 of the gaming machine 1002. The bill stacker can hold a maximum number of bank notes or printed tickets, such as up to two thousand.

The gaming machine 1002 can include a sensor for detecting a fill level of the bill stacker. When the bill stacker is full or close to being full, the gaming machine 1002 can be placed in a tilt mode. Next, the cabinet door 1014 can be opened by authorized casino personnel and the full bill stacker can be replaced with an empty one. Then, the door 1014 can be closed and the gaming machine 1002 can be restored to a normal operational mode in which it is available for game play.

One function of the printer 1022 is to print "cash out" tickets. In a "cash out," credits available on the gaming machine can be transferred to an instrument, such as a printed and/or magnetically encoded ticket, or wirelessly transferred by way of a secure link to an appropriate account (e.g., the primary player's account) for later access. Typically, a "cash out" can be initiated in response to pressing one of the physical buttons, such as 1032 or 1034, or touch screen button output on a display, such as primary display 1018 or a secondary display such as the one 1026 illustrated to be smaller than and disposed below the primary game outcome display 1018.

In one embodiment, the printer 1022 can be a thermal printer. The printer can be loaded with a stack of tickets, such as a stack with two hundred, three hundred or four hundred tickets. Mechanisms in the printer can grab tickets from the ticket stack and transport the tickets past the print heads for printing. The ticket stack can be located in an interior of the gaming machine cabinet 1008.

The printer 1022 can include sensors for detecting paper jams and a status of the ticket stack. When a paper jam or low ticket stack is detected, the gaming machine 1002 can enter a tilt mode where game play is suspended. In one embodiment, a tower light 1005 disposed above the upper box 1010 can light to indicate the tilt status of the gaming machine 1002. After the tilt condition is cleared, such as by clearing the paper jam or replenishing the ticket stack, the gaming machine 1002 can enter a normal operational mode where game play is again available.

Figure 5A:
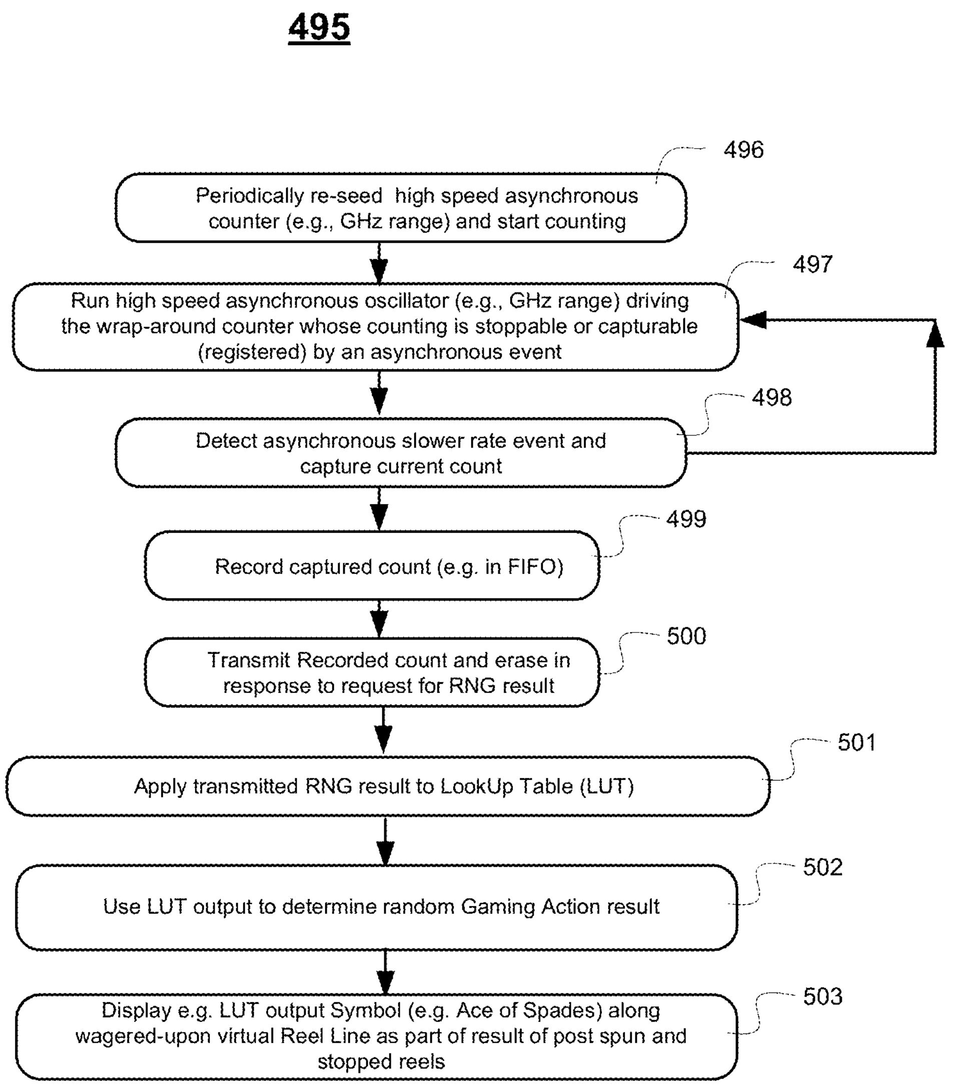
FIG. 5A illustrates a random number generation method.
Figure 5B:
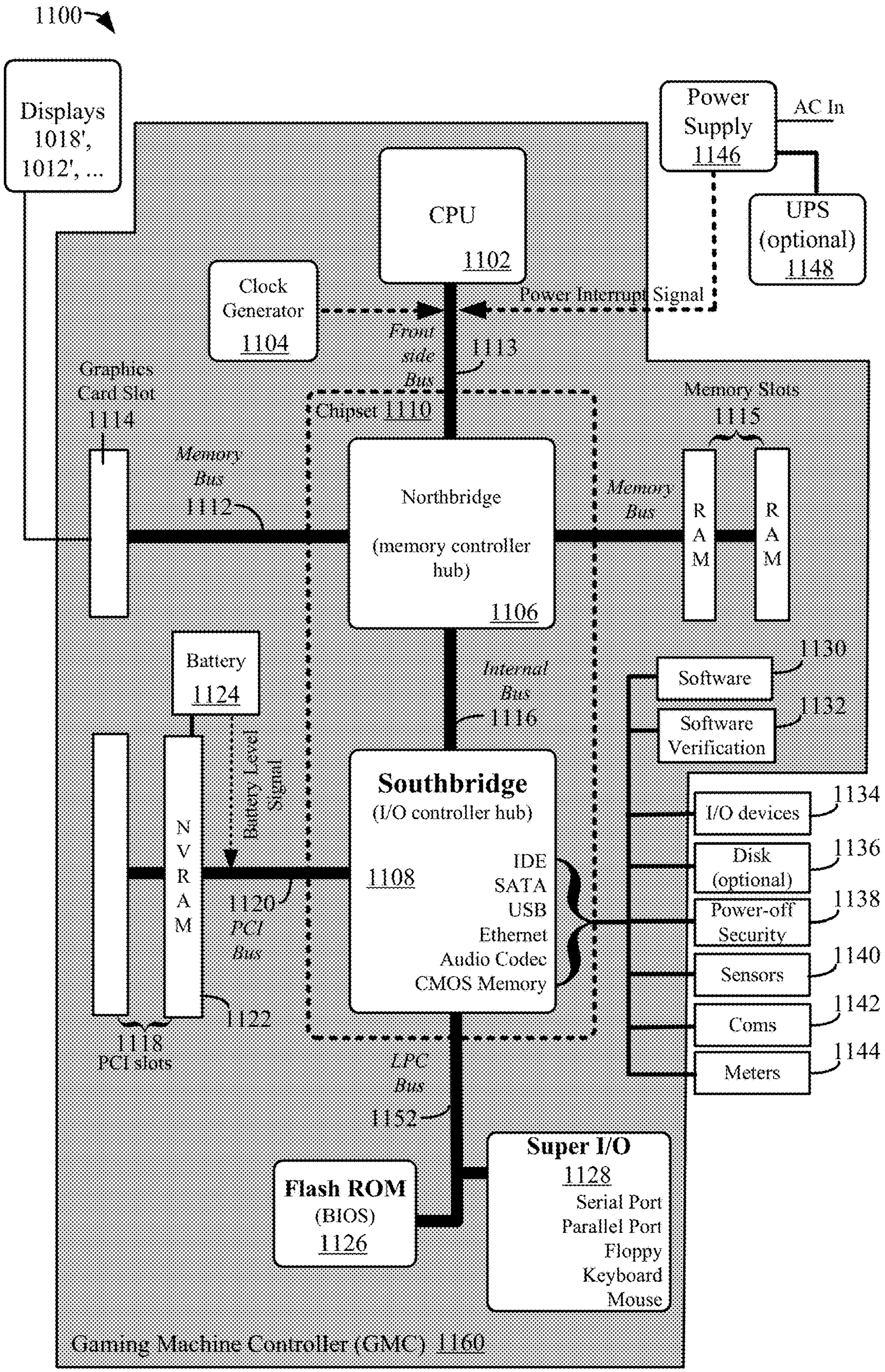
FIG. 5B illustrates a block diagram of gaming machine components including a gaming machine controller in accordance with the present disclosure.

In particular embodiments, the printer 1022 can be coupled to a gaming machine controller (see GMC 1160 in FIG. 5B). The gaming machine controller 1160 can be configured to send commands to the printer which cause a "cash out," ticket to be generated. In addition, the printer 1022 can be coupled to other systems, such as a player tracking system (e.g., 1060 in FIG. 2). When coupled to the player tracking system, commands can be sent to the printer 1022 to output printed tickets redeemable for comps (comps refer to complimentary awards, such as but not limited to free credits, a free drink, a free meal or a free room) or printed coupons redeemable for discounts on goods and services.

As mentioned, in some embodiments, one or more wireless interfaces 1046 can be provided to operate as secured and/or unsecured wireless communication connections 1036. The wireless connections can be established for example between the gaming machine 1002 and one or more mobile devices, such as smart phone 1006. The wireless connection 1036 can be used to provide functions, such as but not limited to player tracking services, casino services (e.g., ordering drinks) and enhanced gaming features (e.g., displaying game play information on the mobile device). The wireless connection 1036 cannot, however, be used to provide reconfiguration of EGM's and/or their associated controllers (e.g., the progressive pool controllers or PPAC's). The wireless interface can be provided as a stand-alone unit or can be integrated into one of the devices, such as the bill/ticket acceptor 1022 and the card reader 1028. In addition, the bill/ticket acceptor 1022 and the card reader 1028 can each have separate wireless interfaces for interacting with the mobile device. In one embodiment, these wireless interfaces can be used with a wireless payment system, such as Apple Pay™ or Google Pay™. The wireless payment system can be used to transfer funds to the gaming machine that can be used for wager-based game play.

The door 1014 can allow secured entry access an interior of the cabinet 1008. Via this access, devices mounted within the cabinet, such as displays 1018, 1026; speakers 1020*a*, 1020*b*; bill/ticket acceptor 1022 or printer 1024 can be serviced and maintained. For example, a receptor configured to receive currency and tickets, coupled to the bill acceptor, can be emptied. The receptor is often referred to as a bill stacker. In another example, blank tickets can be added to the printer 1022 or paper jams can be cleared from the printer. When door 1014 is opened, the gaming machine can enter a hard tilt state where game play is disabled. Although not explicitly shown, the audiovisual input/output mechanisms of the gaming machine 1002 need not be limited to the illustrated displays 1018, 1026; speakers 1020*a*, 1020*b* and buttons 1032, 1034. Additional audiovisual input/output mechanisms may come in the form of touch-sensitive screens, haptic input/output devices such as vibrators, subwoofers, microphones for picking up verbal requests or audible indications of excitement by the primary player or adjacent other persons and so on. In one embodiment, the chair 1003 may be instrumented so as to detect not only when the primary player 1007 is seated on it, but also when that player is jumping up and down or otherwise moving in the chair due to heightened emotions. This detected movement can be feedback to the services providing network 1004 for adaptively learning what gaming combinations tend to provide more excitement and/or entertainment. With authorization by the primary player 1007, a microphone and/or motion detector on his/her mobile device 1006 may be activated to provide similar automated feedback.

In addition, a number of further devices (not shown) can be provided within the interior of the cabinet 1008. A portion of these devices is not visible through an aperture in the gaming machine cabinet 1008. For example, a gaming machine controller (GMC) which controls play of a wager-based game on the gaming machine can be found within the cabinet 1008. Typically, the gaming machine controller is secured within a separate lockable enclosure. Details of the gaming machine controller are described below with respect to element 1160 in FIG. 5B.

As another example, a number of security sensors can be placed within the interior of the cabinet 1008. The security sensors (e.g., see 1140 in FIG. 5B) can be configured to detect access to the interior of the gaming machine 1002. For example, the sensors can be configured to detect when the locking mechanism 1016 is actuated, the door 1016 is opened or a locking mechanism associated with the gaming machine controller enclosure is actuated. A power source, separate from an external power supply, such as a battery can be provided which allows the security sensors to operate and be monitored when the external power supply is not connected or stops functioning for other reasons.

In particular embodiments, the cabinet 1008 can have a sheet metal exterior designed to provide the rigidity needed to support top boxes, such as 1010 and light kits as well as to provide a serious deterrent to forced entry. For example, the sheet metal can be sixteen gauge steel sheet. Additionally, the door, such as 1014, can be backed with sheet steel in the areas around the displays. Other materials, such as wood, wood composites, can be incorporated into the cabinet and the example of sheet metal is provided for the purposes of illustration only.

Speakers, such as 1020*a* and 1020*b* (only two shown, but there can be more elsewhere disposed), can be protected by a metal screen. In one embodiment, a speaker, such as 1020*a* or 1020*b*, can include a subwoofer speaker portion. In general, a sound system associated with the gaming machine 1002 can include an audio amplifier and one or more speakers of various types, such as subwoofers, midrange speakers, tweeters and two-way speakers that also accept voice input.

If the main cabinet 1008 is entered, a "DOOR OPEN TILT" can be displayed halting game play and causing a "DOOR OPEN" event to be sent to the slot accounting system in 1004. In one embodiment, this message can be displayed on the main display 1018. These events can also be stored to the power hit tolerant memory. Upon door closure, the "DOOR OPEN TILT" will be replaced with a "DOOR CLOSED TILT" that can clear after the completion of the next game cycle. Additionally, a logic "DOOR OPEN TILT" can occur if the logic door is opened. The logic door is configured to be lockable independent of how the switch wiring is installed. The gaming machine 1002 can be configured to initiate the logic DOOR "OPEN TILT" regardless of whether or not a lock is installed on the logic door.

The displays such as 1018, 1012 and 1026, the speakers 1020, the printer 1022, the bill acceptor 1024, the card reader 1028 and the button panel 1030 can be used to generate a play of a wager-based game on the gaming machine 1008. Further, the primary display 1018 can include a touchscreen function. The touchscreen function can be used to provide inputs used to play the wager-based game. Some examples of wager-based games that can be played include but are not limited to slot games, card games, bingo games and lottery games. The wager-based games are typically games of chance and utilize a random number generator to determine an outcome to the game.

In general, the wager-based games can be classified as Class II and Class III games. Class II games can include bingo, pull tabs, lottery, punch board, tip jars, instant bingo and other bingo like games. Class III games can include but are not limited to slot games, black jack, craps, poker and roulette.

As described above, the wager-based game can be a slot game. The play of the slot game can involve receiving a wager amount and initiating a start of the wager-based game. A selection of a wager amount and a start of the wager-based game can be performed using buttons, such as 1032 and 1034, on button panel 1030. In addition, the button panel can be used to perform gaming functions, such as selecting a number of lines to play in a slot game, selecting the amount to wager per line, initiating a cash-out and calling an attendant. These functions will vary for different types of games.

In some embodiments, a touch screen function can be provided in or adjacent to (e.g., over) one or more of the displays, such as 1012, 1018 and/or 1026. The combination of the display and touch screen can be used to perform gaming functions that performed using the button panel 1030. Also, display and touch screen can be used to perform operator features, such as providing a game playback or a hand pay.

The play of wager-based game, such as a slot game, can involve making a wager and then generating and outputting a game presentation. The bet amount can be indicated in display area 1042. The game presentation can include a number of game features that vary from game to game. The game features provide variety in how the outcome to the wager-based is presented. For example, an award to the outcome of the game can be presented in a series of steps that vary from game to game. In some instances, a portion of the total award for a game can be awarded in each step. The steps and their graphical presentation can be referred to as game features. In various embodiments, information associated with one or more of the steps can be stored to a power hit tolerant memory. The power hit tolerant memory is discussed in more detail with respect to FIG. 7.

As an example, a portion of a slot game outcome presentation is shown on display 1018. The slot game outcome presentation can include displaying a plurality of normal reel symbols, such as pointed to by reference 1038 (e.g., blazing sun symbol, wild card symbol, bonus symbol etc.). During the game outcome presentation, the symbols can appear to move on the display 1018 (e.g., vertically to simulate a rotating reel). In addition, symbols can be made to appear to move off the display 1018 and new symbols can be made to newly appear onto the display 1018.

Different combinations of symbols can appear on the primary display 1018 for some period of time, which varies for each instance of the wager-based game that is played. At the end of an action-filled presentation, the symbols can be made to appear to settle and reach a final position or spin outcome. Then an award associated with the game outcome is presented on the display. The total award for the game can be indicated in display area 1044 for example and the total credits available on the gaming machine after the award can be indicated in display area 1040.

In particular embodiments, a portion of the award to the outcome of a game or spin can be presented as a bonus game or a bonus spin (e.g., a free spin). The portion of the award can be referred to a bonus award. The presentation of the bonus award can also be presented in steps where a portion of the bonus award is awarded in each step. These steps can be referred to as bonus game features. In some embodiments, information associated with the steps in the bonus game can be stored to the power hit tolerant memory. In various embodiments, components of the bonus game presentation can be presented on one or more of display 1018, 1012 and 1026.

More specifically in one embodiment, when a given spin takes place (e.g., indicated as such in one of display areas 1018, 1012 and 1026), a by-chance bonus awarding wheel 1012*b* is presented for actuation by the primary player 1007 (or by a casino dealer in case of a table game) and when actuated, it starts spinning. As the symbols of the spinning wheel 1012*b* in the primary display area 1018 start settling into a near-final outcome state, a relatively large horizontal announcement area 1012*h* may first indicate how close to a jackpot win is the state of the spinning wheel 1012*b*, and then when the wheel 1012*b* finally settles into its final outcome state, announcement area 1012*h* may indicate the win as shown at 1012*e* (e.g., "Jackpot!!!) or how close the spin came (e.g., "Missed by one rung!"—not shown). Announcement area 1012*h* may also be used to indicate the winning of low frequency hands (e.g., "Royal Flush Here!!"—not shown).

Next, referring to FIG. 2, further details of one embodiment of the network services providing portion 1004 and of gaming machine operations, including securitization features and possible points of weakness are described. In FIG. 2, gaming system 1050 includes three banks of gaming machines, 1052*a*, 1052*b* and 1052*c*. For purposes of illustration, three side-by-side gaming machines are shown in each bank although a different number could be used (e.g., 4, 5, 6 etc.) and different configurations (e.g., back-to-back rows).

The network services providing portion 1004 includes a central determination server 1054, a local progressive server 1056, a wide area progressive server 1058, a player tracking/slot accounting system server 1060 and ticket-in/ticket-out (TITO) server 1062. In gaming system 1050, all of the gaming machines in each bank, 1052*a*, 1052*b* and 1052*c*, are operatively coupled to the slot accounting system server 1060 and the TITO server 1062. However, only the gaming machines in bank 1052*a* are coupled to the central determination server 1054. Further, only gaming machines in bank 1052*b* and display 1068 are coupled to the local progressive server 1056. Finally, only the gaming machines in bank 1052*c* are coupled to the wide area progressive server 1058. The communication couplings between the gaming machines in each bank and the servers 1054, 1056, 1058, 1060 and 1062 can be wired connections, wireless connections or various combinations/permutations thereof.

In various embodiments, the central determination server 1054 can be used to generate a controlling portion of the game played on the gaming machines in bank 1052*a*. For example, the central determination server 1054 can be used to generate random numbers used to determine outcomes to the games played in bank 1052*a*. In another example, the central determination server 1054 can be used to generate all or a portion of the graphics used during play of the games on the gaming machines in bank 1052*a*. For instance, the central determination server 1054 can be configured to stream a graphical presentation of a game to a gaming machine, such as that of upper display graphics 1064 and/or of the gaming machine's lower displays. (Lower displays not numbered here because primary player 1062*a* is illustrated obstructing those further displays.) The streamed upper display graphics 1064 may include that which on occasion (e.g., randomly or pseudo-randomly) reveals an active special bonus situation (e.g., Possible Jackpot win Here), reveals the awarding of a substantial prize (e.g., Jackpot !!! 1012*e*). The streamed graphical presentations can be output to respective displays on respective ones of the gaming machines and also to additional larger displays mounted on walls or other fixtures near the respective bank of machines.)

In one embodiment, the central determination server 1054 can be used to generate numbers used in a bingo type games played on the gaming machine in bank 1052*a*. These bingo type games are often referred to as class II games whereas traditional slot machines are referred to as class III games. In class II games, a draw of numbers is made. The numbers can be mapped to a bingo card, which the player purchases to play the bingo game. The draw of numbers can result in at least one winning game combination on the bingo cards participating in the current bingo game.

The central determination server 1054 can be configured to repeat the number draws for the bingo games at regular intervals. For example, number draws can be repeated every 20 milliseconds. Players at the various gaming machines coupled to the central determination server 1054, such as the players at the gaming machine in bank 1052*a*, can initiate bingo games which utilize the bingo numbers from a particular bingo number draw. The bingo numbers in the number draw can be mapped to a bingo card displayed on the screen of the gaming machine, such as 1064.

Wins can be indicated by a winning pattern on the bingo card, such as four in a row or four corners. In response to a winning pattern on a bingo card on a particular gaming machine, the central determination server 1054 can send a prize amount associated with the win to the gaming machine with the winning pattern. This prize amount can be displayed on the gaming machine and the credits associated with the prize amount can be deposited on the gaming machine. For example, win of a bingo game on gaming machine 1064 can result in a prize amount being displayed on the main display. Further, the prize amount can be deposited as credits on the gaming machine 1064 such that the credits are available for additional game play.

In one embodiment, the prize amount can be output to look like a slot game. For example, if the prize amount is ten credits. Video reels can be displayed spinning on a main display of the gaming machine and a reel combination associated with a ten credit win in a slot game can be output to the display screen. If the outcome to the bingo game on a particular gaming machine is no award, then the video reels can be displayed spinning and a reel combination associated with no award in the slot game can be displayed on the gaming machine. This process can be repeated on various participating gaming machines, as number draws for various bingo games are initiated and completed on the central determination server 1054.

The local progressive server 1056 can be used to generate one or more progressive prizes that are limited to a local group of gaming machines, such as only the gaming machines in bank 1052*b*. When games are played on the gaming machine in bank 1052*b*, an amount of each wager can be contributed to one or more progressive prizes. The local progressive server can receive the contribution amounts from the gaming machines linked to the progressive game and can keep track of the prize amounts associated with the one or more progressive prizes. The prize amounts for the one or more progressive prizes can be output to displays on the participating gaming machines as well as to separate displays near the participating gaming machines.

The local progressive server 1056 can be configured to receive information regarding gaming events on the participating gaming machines. For example, the local progressive server 1056 can be configured to receive a notification from each of the participating gaming machines when a game outcome has occurred associated with a win of a progressive prize. In other examples, the local progressive server can be configured to receive gaming information, such as when each game is played on one of the participating gaming machines, an amount of wagered for each game and when one or more type of game outcomes occur on each of the gaming machines.

The gaming information associated with gaming events on the one or more gaming machines can provide a basis for additional bonus scenarios. For example, a bonus award can be triggered on one of the gaming machines after a random number of games are played on the gaming machines as a group. As another example, a bonus award can be triggered on one of the gaming machines after a particular game outcome occurs a random number of times on the participating gaming machines as a group, such as a particular combination of symbols appearing a random number of times.

The wide area progressive server 1058 is connected to the gaming machines in bank 1052*c* and display 1066. The wide area progressive server 1058 can be used to enable a progressive game played on gaming machines distributed over a wide area, such as multiple casinos distributed within a state. Similar to the local progressive server 1058, when wagers are made, the wide area progressive server 1058 can receive contributions to the progressive prize from the participating gaming machines. The wide area progressive server 1058 can report these contributions to a remote device which tracks the total progressive jackpot. Further, if a progressive jackpot is won on one of the gaming machines to which it is connected, the wide area progressive server 1058 event can be reported to the remote device. Yet further, the wide area progressive server 1058 can receive a current progressive jackpot amount from the remote device. The current progressive jackpot amount can be reported on displays on the gaming machines participating in the progressive jackpot and/or nearby signage, such as 1068.

An exemplary display 1068 of yet another gaming machine or other display device (e.g., wide area display device) can have a digital sign controller 1070. The digital sign controller 1070 can have a network interface which allows it to communicate with a remote device, such as the wide area progressive server 1058. In this example, the digital sign controller 1070 can be configured to output information to display 1068 associated with the progressive game, such as a current jackpot amount.

In general, displays with digital sign controllers can be provided through out a gaming environment, such as casino. The digital sign controller, such as 1070, can be configured to communicate with a remote device. The remote device can be configured to send information to the digital sign controller to output to a display. The information can include video, audio and picture data. Further, the remote device can be configured to send commands to the display, such as a command to output information to the display. In one embodiment, the wide area display devices (e.g., 1068) may provide announcements of when particular gaming machines (e.g., 1002) in the local area have awarded beyond a predetermined threshold number.

The slot accounting system portion of server 1060 can receive accounting information from each of the gaming machine in system 1050, such as an amount wagered for each game and amounts awarded on each gaming machine and/or the number of further extra gains awarded due to initially settled upon outcome combinations (e.g., K, A, J, Q) and follow up bonus award opportunities. The server 1060 can also receive information which uniquely identifies each gaming machine including a machine ID number and a current game being played on the gaming machine. The accounting information can be used for auditing purposes.

The player tracking system portion of server 1060 can track the game play of individual users. For example, a player can input account information into one of the gaming machines that is associated with a player tracking account that has been previously set-up. Based on the account information, a particular player tracking account can be located. The player tracking account can include information which identifies an individual user, such as user 1062*a* (User 1062*a* can be playing games at one of the gaming machines in bank 1052*a*.). The player tracking account information can include a player's name, address, phone number, gender, etc. It is to be understood that the graphics presentations on any given gaming machine can be structured for entertainment and heightened emotions and/or expectations of not only the primary player 1062*a* but also for that of nearby other persons 1062*b*.

In one embodiment, a player, such as user 1062*a*, can insert a player tracking card in a card reader (e.g., see card reader 1022 in FIG. 1). The card reader can read player tracking account information from the player tracking card, such as on a magnetic strip on the card, and send the information to the player tracking/slot account system server 1060. Based upon the received player tracking account information, the player tracking system portion of server 1060 can locate a player tracking account.

The player tracking account information can be input via other means on the gaming machine. For example, as shown in FIG. 1, the gaming machine 1002 may be able to communicate with a mobile device, such as 1006. Thus, in one embodiment, the gaming machine 1002 may be configured to directly receive player tracking account information from a mobile device. In another embodiment, the gaming machine 1002 may be configured to generate an input interface on a touch screen display that allows a player to input player tracking account information.

After the player provides account information and an account is located, the player tracking system can enter accounting information associated with a player's game play into the identified player tracking account, such as an amount wagered over time. As described above with respect to FIG. 1, the accounting information associated with a player's game play can provide a basis for awarding comps to the player. For example, based upon a player's previous game play, the player tracking system portion of server 1060 can send an amount credits to the gaming machine on which the player is playing. In another example, the player tracking system portion of server 1060 can send a command to a printer (e.g., see 1022 in FIG. 1) on the gaming machine on which the player is playing to print out a ticket. The ticket can be redeemable for goods or services or a discount on goods or services, such as a free meal or discount a meal.

As described above, each of the gaming machines can be coupled to a ticket-in/ticket out (TITO) server 1062. TITO server 1062 can be used to generate and validate instruments associated with a credit and/or cash value. One example of an instrument, which can be generated and validated, is a printed ticket. Another example is a digital instrument, such as a printed ticket stored in a digital form. In one embodiment, a digital instrument can be stored on an electronic device carried by a user, such as a mobile device carried by user 1062*a*.

As an example, when a printer, such as 1022, is employed in a "cash out," the gaming machine controller (e.g., see GMC 1160 in FIG. 5B) can contact a TITO server (e.g., see 1062 in FIG. 2) with a cash out amount. In response, the TITO server can generate a unique number, associate the unique number with a value and send the gaming machine a unique number. The unique number can be sent to a printer (e.g., see printer 1022 in FIG. 1). Then, the printer can print a ticket with the unique number, such as a unique number encoded in a bar-code, and a value of the ticket, such as five dollars.

When the ticket is later presented for redemption, the unique number can be used to validate the ticket. For example, the user 1062*a* can "cash out" at a first gaming machine, such as 1064 in bank 1052*a*, and receive a printed ticket with a unique number generated by the TITO server 1062. Then, the user 1062*a* can go to a gaming second gaming machine, such as 1066 in bank 1052*c*, and insert the ticket into a bill acceptor (e.g., see 1024 in FIG. 1). The second gaming machine 1066 can contact the TITO server 1062 and send the ticket information, i.e., the unique number read from the ticket, to server 1062. Then, the server 1062 can validate the ticket and send back to the second gaming machine 1066 an amount of credits to deposit on the second gaming machine. The deposited credits can be used for additional game play.

In these examples, the servers can include processors, memory and communication interfaces. Various gaming functions are associated with each of the servers, 1054, 1056, 1058, 1060 and 1062. The described distribution of gaming functions is for the purposes of illustration in only. In alternate embodiments, combinations of gaming functions can be combined on the same server or repeated on different servers. For example, the central determination server 1054 can also be configured to provide a local progressive to the bank of gaming machine 1052*a*. In another example, the local progressive server 1056 can be configured to provide a number of different progressive prizes for different groups of gaming machines. In yet another example, the player tracking system portion of server 1060 can be configured to provide bonusing features at each of the gaming machines.

In FIG. 2, while gaming machines, such as those of displays 1064 or 1066, are operational, a user such as 1062*a* can engage in game play. Under some conditions, such as tilt conditions, game play can be suspended and an intervention by a casino-authorized operator, such as 1065, may be required. An operator intervention may require an operator, such as 1065, to be directly present at a gaming machine, such as that of display 1064. For example, the presence of an operator may be required to access an interior of the gaming machine to clear a tilt condition. In other examples, an operator may be able to clear a tilt condition from a remote location via a near field or other communication coupling with the gaming machine (e.g., using a mobile device such as 1006). One reason for requiring physical presence of casino-authorized operators (e.g., 1065) whenever the interior of a gaming machine (or of another gaming controller) is accessed is so as to provide an audit trail of who accessed what machine when and for what allegedly purposes. Typically there will be overhead video cameras watching the casino floor and recording all activities including that of various personnel accessing the interiors of respective gaming machines and/or gaming controllers. Direct remote reconfiguration of gaming machines and/or gaming controllers is not permitted at least in certain circumstances.

In one embodiment, during game play, the gaming machine can award an amount above some threshold amount. Prior to receiving the award, an operator, such as 1065, can be sent to the gaming machine to have the player fill out a form for tax purposes. In the United States, this tax form is referred to as a W2G form. In addition, the operator may verify that the gaming machine was operating properly when the award was made prior to the player receiving the award. For example, if the gaming machine indicates a progressive jackpot has been won, the operator may check to verify the gaming machine was operating properly. In a hand pay, the operator, such as 1065, may provide an instrument redeemable for the jackpot amount.

As described above and in more detail with respect to FIGS. 1, 2, 6 and 7, an operator, such as 1065, may be required to be physically present at a gaming machine, such as 1064 and 1066, to clear a tilt condition. For example, to clear a tilt condition, the operator, such as 1065, may have to access an interior of a gaming machine to clear a paper jam in a printer or a bill acceptor (e.g., see printer 1022 and bill acceptor 1024 in FIG. 1). In another example, to clear a tilt condition, the operator 1065 may have to access an interior of the gaming machine, such as 1064, to add more tickets to a ticket printer or empty a note stacker associated with the bill acceptor. For some tilt conditions, the gaming machine operator 1065 may access a menu output on a main display of the gaming machine, such as 1064 or 1066, to perform a RAM clear. RAM clears are described in more detail below with respect to FIG. 5B.

As earlier mentioned, the various data processing devices (e.g., 1054-1064) in the network services providing block 1004 and in the individual slot or other software driven gaming apparatuses (e.g., 1052*a*-1052*c*) or combinations thereof are generally dependent on called upon and executed software programs (not individually shown). A conventional installation of one or more software programs may proceed as follows. One or more software coding persons or code updating persons 2013 working in a secured code production shop 2012 (one authorized by the vendor of the software) generate corresponding pieces of source code 2014. The generated source code or codes 2014 is compiled by an automated compiler 2015. Installable object codes 2016 produced by the compiler 2015 are transmitted to a build assembler 2020. The build assembler 2020 creates an installation build from the received object codes 2016 and the installation build is transmitted 2022 to an appropriate automated software installer 2030. At install time, the software installer 2030 is operated to automatically copy the to-be-installed object codes 2016 into one or more respective portions of the network services providing hardware 1004 and at the same time generates respective SHA-1 hashes of respective segments of the being-installed object codes 2016. The generated SHA-1 hashes are automatically stored into corresponding records within a database server 2050. Although not specifically indicated in FIG. 2, it is to be understood that transmission action 2022 is not permitted to be a direct remote electrical transmission from a remote location into the premises of the casino environment 1050. Rather, a casino-authorized operator (e.g., 1065) is typically asked to hand-carry a storage device (not shown) that has been pre-validated to a secure housing of the respective unit that is to be reconfigured, to use door access security keys to open up the secured housing, to login to the respective unit with use of appropriate casino managed security keys and then to follow a prespecified set of instructions for carrying out the desired reconfiguration. Typically, the casino-authorized operator that carries out such reconfiguration needs to be highly trained to carry out the prespecified set of instructions.

After installation, an automated software verifier 2040 is activated and used for comparing hashes of the installed software segments (which should be the same as corresponding segments of the compiled code 2016) against the respective hashes that had been stored in the database server 2050. If all of the compared hashes match, then the installed software segments are deemed ready to be run (executed) within the network services providing hardware 1004 and/or in whatever destination data processing units (e.g., in respective ones of gaming apparatuses 1052*a*-1052*c*) they are predestined to be transmitted to by way of a secured transmission mechanism (not shown). In one embodiment, each time new or updated software is to be installed in the network services providing hardware 1004, a government official 2010 or other authorized agent/inspector authorized to do so, is called in to oversee the installation process and to obtain as an output of the software installer 2030 of its generated SHA-1 hashes in the form of a GLI certification letter 2011 that is in compliance with the latest government requirements and includes an unalterable copy of the SHA-1 hashes created for the respective segments of the received and installed object codes 2016.

Thereafter, the government official/agent 2010 may return at any time to run the software verifier 2040 for the purpose of accessing respective segments of the installed object codes (2016) within the network services providing hardware 1004 and automatically generating SHA-1 hashes for those accessed respective segments of the installed object codes and then comparing (2009) the generated hash values against the SHA-1 hashes in the GLI certification letter 2011 to thereby verify that nothing has changed.

It is generally in the interest of the casino to also run the software verifier 2040 for the purpose of obtaining automatically generated SHA-1 hashes for respective segments of the installed object codes (2016) within the network services providing hardware 1004 before those respective segments are allowed to execute (e.g., each time one or more of the respective segments is called upon) and comparing them against the SHA-1 hashes in the database server 2050 to thereby verify on a more frequent basis that nothing has changed. If the automatically generated hashes produced by the casino's software verifier 2040 match the database's SHA-1 hash values, then an OK to proceed signal 2004 is fed back to the network services providing hardware 1004 to allow the latter to run or download to a gaming machine (e.g., 1002) the respective executable.

Although the above procedure provides good securitization, it suffers from several drawbacks including the requirement that transmission path 2022 includes hand carrying of a data storage device to the casino environment and that a highly trained operator (e.g., 1065) is required to be present at the site and to carry out the pre-specified instructions for reconfiguring the system. This is costly and time-consuming for both the code production shop 2012 and the casino (e.g., and having to provide the highly trained operator 1065).

Figure 3A:
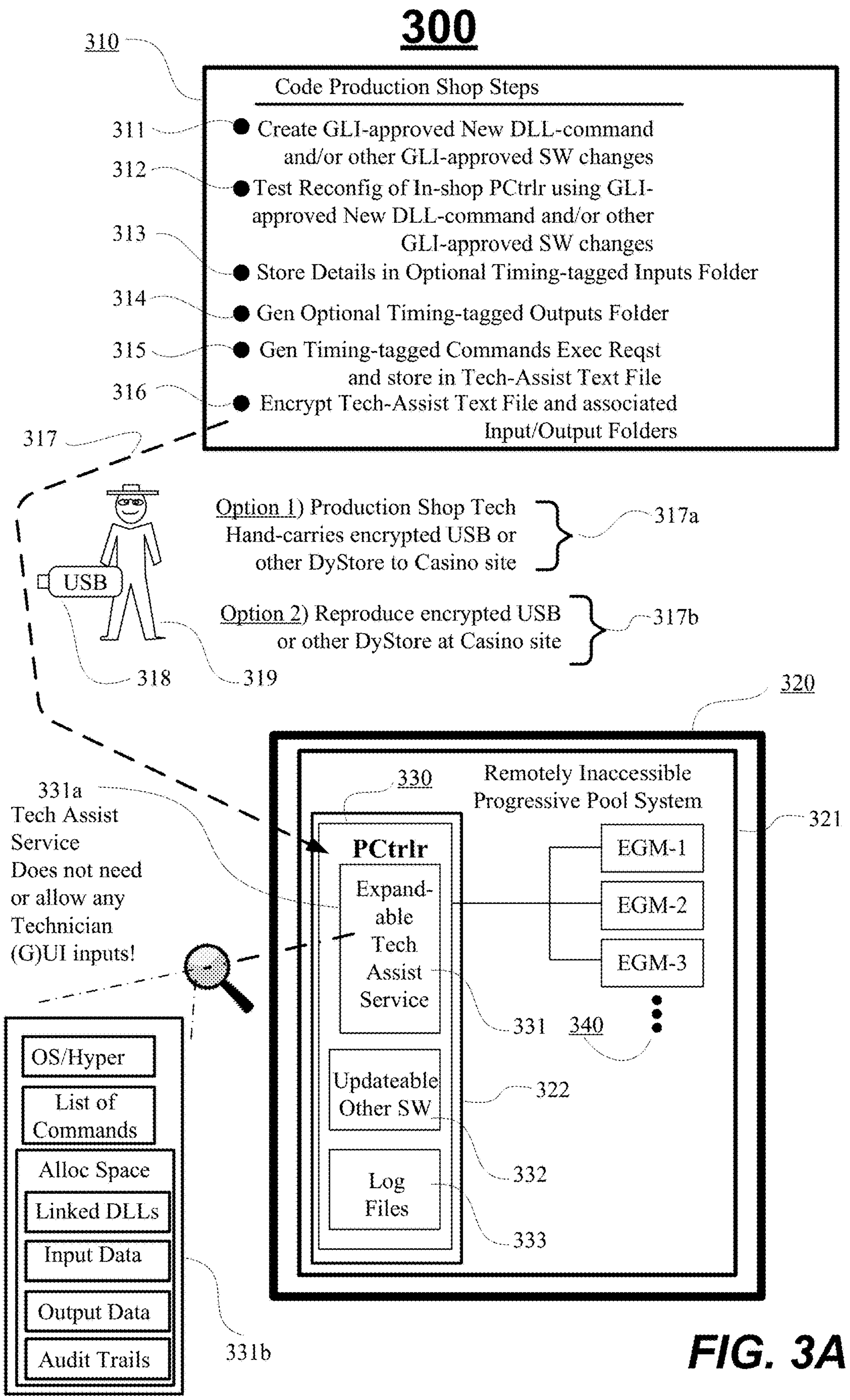
FIG. 3A provides an overview of a first part of a method in accordance with the present disclosure.

Referring to FIG. 3A, shown is a machine-assisted and security-maintaining process 300 that includes first steps (311-316) carried out, for example, in a secured code production shop 310 that is authorized by the vendor of the gaming machines and second steps (not explicitly shown) carried out within the casino environment 320. In the schematic depiction of FIG. 3A, block 321 represents a gaming system whose internal machines (e.g., 330, 340) are not permitted to receive any reconfiguration instructions directly by remote reach from remote sources. Rather, an authorized human operator 319 is required to hand-carry a secured data storage device (e.g., USB thumb drive 318) to the site of the remotely-inaccessible gaming system 321 (in this case a remotely inaccessible progressive pool system), to use a first security key to open a mechanically secured housing (e.g., 322) of a machine that is to be reconfigured (e.g., progressive controller 330) and to manually plug the secured data storage device (e.g., USB thumb drive 318) into a wired receptacle (e.g., USB receptacle) of the to-be-reconfigured machine (e.g., progressive controller 330) for thereby initiating an automated reconfiguration of that machine. In accordance with the present disclosure, the authorized operator 319 does not interact with a user-interface (UI) or graphical user interface (GUI) after plugging in the secured data storage device 318. Instead, upon detection of the plugged in data storage device 318, service software 331 running inside the to-be-reconfigured machine (e.g., progressive controller 330) takes over and does all the rest. That software is referred to herein as an expandable Tech-Assist service 331. The Tech-Assist service 331 signals to the authorized operator 319 when it has finished its tasks and the operator 319 then unplugs the secured data storage device 318, closes and locks the mechanically secured housing 322 and returns the secured data storage device 318 back to the secured code production shop 310 (not shown in FIG. 3A, see instead return path 317' of FIG. 3B). Within FIG. 3A, item 332 represents other software and/or programmably configurable hardware inside the PCtrlr 330 that the TA-Service 331 may be commanded to update or reconfigure. Item 333 represents log files that are automatically updated and maintained by the PCtrlr 330. These log files 333 may record results of gaming actions, progressive award updates and other activities associated with a pool 340 of electronic gaming machines (EGM-1, EGM-2, EGM-3, etc.) that the PCtrlr 330 is responsible for managing. In one embodiment, the log files 333 include a record of all TA-Command following programs executed by the TA-Service 331 including their respective identification tags and start and end of execution as well as other related data (e.g., size of output). In one embodiment, one of the TA-Commands executable by the TA-Service 331 is to retrieve recent ones of the log files 333 that show what other TA-Commands (including their ID tags) had their respective command following programs recently executed (e.g., within the last week, month, etc.) and store those in the USB. This way, when the USB 319' is returned to the authorized production shop (see return path 317' in FIG. 3B) authorized personnel in the shop can verify that only authorized TA-programs (as identified by their ID tags) were run (or that some which should have been run were not run).

Figure 4A:
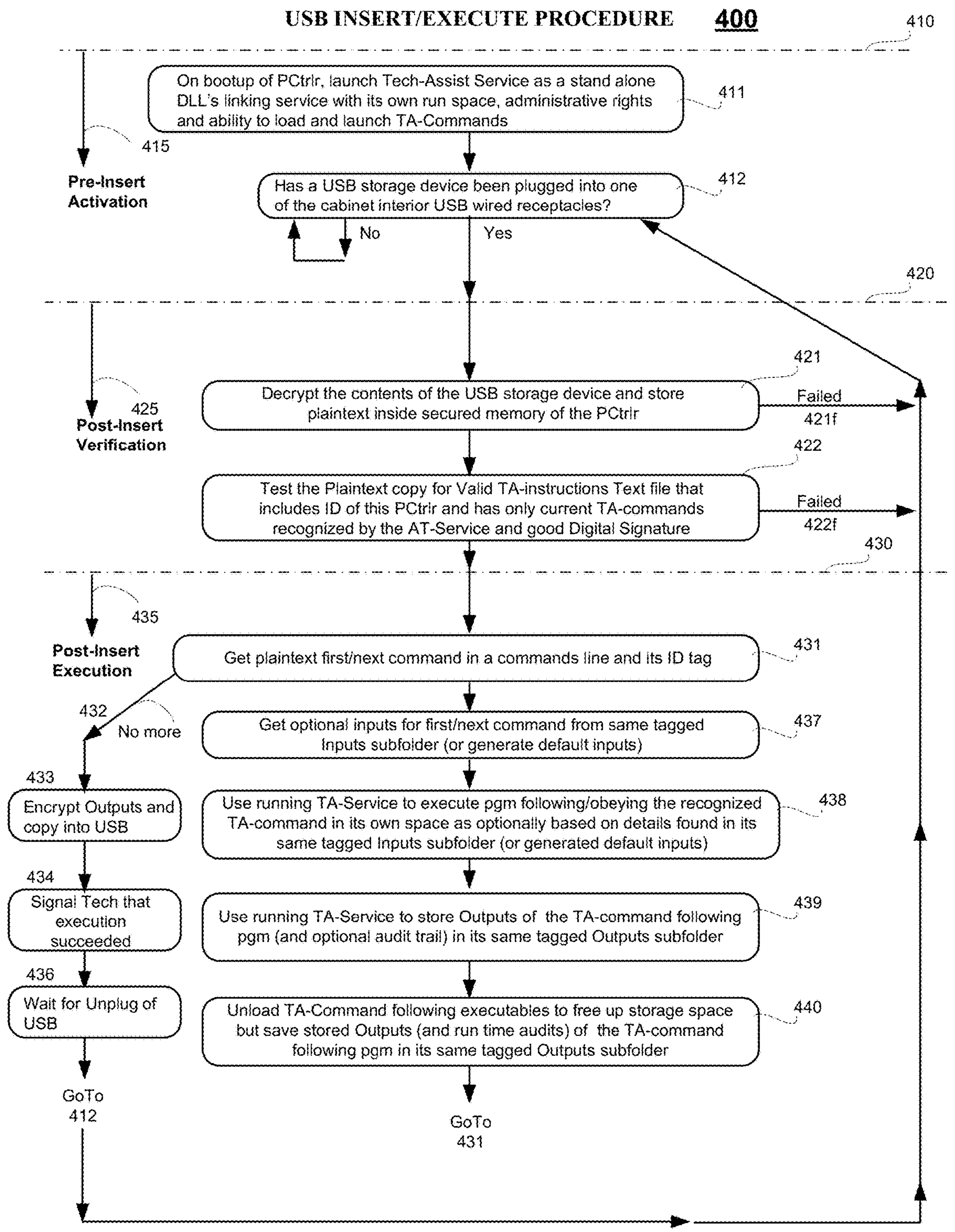
FIG. 4A illustrates a method carried out by a service that automatically repeatedly executes within a game controller.

The Tech-Assist service 331 (TA-service for short) is initiated upon, and constantly (or at least automatically repeatedly) runs after the PCtrlr (330) boots up. It automatically repeatedly checks its wired USB ports for insertion of a valid data storage device 318 having certain characteristics. Referring also to FIG. 4A, a corresponding method 400 has a pre-insert phase 415 below dividing line 410 and a post-insert phase 425 below dividing line 420. At step 411 and in response to booting up of the PCtrlr 330, the latest run time code for the TA-Service 331 is link loaded into its own OS-allocated private space with administrative rights and launched with an ability to form and launch TA-Command-following Programs (TA-programs for short) s in yet other OS-allocated memory spaces. Referring back to FIG. 3A, magnification 331*b* shows that the TA-service 331 runs under an operating system (OS) and/or Hypervisor. The TA-service 331 has a list of currently recognized Tech-Assist Commands where that list includes an AddCommand command (not shown) that allows for the addition and recognition of new Tech-Assist Commands to the list. In one embodiment, the list identifies dynamically link loadable modules (DLL's) needed for forming and running TA-Command-following Programs for each of the currently recognized Tech-Assist Commands. The TA-service 331 can ask the OS/Hypervisor to allocate one or more command execution spaces (only one shown in FIG. 3A) to it. Each allocated space is configured to allow for execution of a respective TA-program. In one embodiment, plural Tech-Assist Command-following programs (TA-programs) are executed in parallel in their respectively allocated spaces so as to complete their respective tasks quickly. The TA-service 331 is configured to identify each TA-program that is to be executed in its respective allocated space, to load and dynamically link within that space a plurality of dynamically link-loadable modules (DLL's) that are indicated by the list (or indicated elsewhere, e.g., by an expert knowledge database—not shown) as being needed to execute the identified Tech-Assist Command-following program. The TA-service 331 is further configured to identify a folder containing input data specifically for the identified TA-program and to operatively also load it into the allocated space such that it can be used by the link-loaded DLL's. In one embodiment, if the input data folder is not present, the TA-service 331 can generate a default set of inputs (e.g., in one embodiment using the expert knowledge database). The TA-service 331 is further configured to determine an amount of additional space needed for output data resulting from execution of the identified TA-program and its inputs. Moreover, in one embodiment, the TA-service 331 is further configured to determine a further amount of additional space needed for storing one or more audit trails of actions taken by execution of the respective TA-program and/or of actions taken by the TA-service 331 while controlling or monitoring the execution of the respective TA-program. After the link-loading process completes, the TA-service 331 launches and monitors the executing TA-program. At completion of the execution of the identified TA-program, the Tech-Assist service 331 records the location of the output data (and the optional audit trail) generated during the execution and the time of completion. It then frees up the space that had been allocated at least for the DLL's and Input data of the execution of the identified TA-program, thus essentially unloading the TA-program and preventing a repeated execution of that specific (tag identified) program. The Output Data and optional Audit Trail(s) are saved for copying back into the USB in encrypted form. In one embodiment, the Tech-Assist service 331 has the ability to ask the OS/Hypervisor to allocate additional output space as needed for execution of a particular TA-program.

It is to be understood that FIG. 3A shows only a few of the components of the PCtrlr 330. A more detailed description of some of the hardware that is usable within the PCtrlr 330 is provided in conjunction with FIG. 5B. More generally, the PCtrlr 330 will contain reprogrammable memory components (e.g., nonvolatile memory) and reconfigurable hardware components (e.g., power supplies, communication interfaces, etc.) where, due to security rules and/or regulations, the data of such reconfigurable components must be secured so as to prevent retrieval and/or modification of such data by unauthorized entities. It will become apparent from the present disclosure that security is maintained in accordance with the teachings of the present disclosure. Details of instructions provided by the authorized code production shop (310) are hidden from unauthorized entities because the contents of the instructions file (360) and the input folders (370) are kept encrypted while in transit. The plaintext versions of these are exposed only inside the secured confines of an authorized code production shop and only inside the secured confines of the target PCtrlr. Similarly, when results of execution of the TA-Commands are being returned to an authorized code production shop (310'), details of the output folders (380) are kept encrypted while in transit. The plaintext versions of these are exposed only inside the secured confines of an authorized code production shop and only inside the secured confines of the PCtrlr that executed the TA-Command following programs.

Referring back to FIG. 4A, after launch and in a subsequent step 412, the launched Service 331 automatically repeatedly tests the wired USB receptacles inside the PCtrlr cabinet 322 for insertion of a USB storage device. If none detected (No), step 412 is repeated. If insertion of a USB storage device (Yes) is detected, control advances to step 421 of a post-insertion verification phase 425. In step 421, the contents of the detected USB storage device (318) are decrypted in accordance with a predetermined decryption process associated with the particular PCtrlr 330. (If a wrong PCtrlr has been picked then according to one embodiment, the decryption fails via path 421*f* and control returns to step 412). In one embodiment, if the validation fails, the technician is prompted to remove the USB 318 from the USB receptacle. The predetermined decryption process may be any sufficiently strong decryption process that makes it difficult for unauthorized entities to break it. In one embodiment, the USB storage device has its own data processor securely encapsulated with the memory (e.g., Flash memory) that stores its data and the USB internal processor automatically erases that contents of the memory if access is attempted more than a predetermined number of times without use of the predetermined decryption process (e.g., one only known to an authorized code production shop (310, 310')).

If the decryption of step 421 succeeds, then the decryption output is stored inside a secured memory area of the progressive controller (PCtrlr). None of the contents of the secured USB storage device are exposed as plaintext outside of a secured interior of the PCtrlr 330 or outside of a secured interior of the code production and analysis shop 310 (see 310' of FIG. 3B for analysis part 354). In subsequent step 422, the decrypted plaintext is tested to make sure it contains Tech-Assist Commands currently recognized by the specific PCtrlr as valid Tech-Assist Commands and no others. In one embodiment, the decrypted plaintext (see for example FIG. 3C) contains an identification of the specific PCtrlr it is intended for (e.g., at line ln.0) and a digital signature (e.g., at line ln.4) of contents of a so-called, TA-instructions file (e.g., a .txt text file) in which the commands are stored as sequentially or in-parallel executable entities and signed for by a trusted entity (e.g., shop 310). The identification of the specific PCtrlr and the digital signature are also tested. If validation test step 422 fails then path 422*f* is taken and control returns to step 412. (In one embodiment, if the validation fails, the technician is prompted to remove the USB 318 from the USB receptacle.) In other words, the process 400 refuses to do anything more for the failing USB storage device and expects the USB to be removed and returned to the code production shop for inspection. In one embodiment, an alert may be automatically sent to proper authorities. In one embodiment, the TA-instructions file must have a predetermined name known to the TA-service (e.g., TA-instructions.txt) and must be stored in a predetermined location or area within the USB storage device 318 (e.g., the storage device's root folder) which predetermined location/area is known to the TA-service.

If validation test step 422 succeeds, control advances to step 431 (part of a post-insertion execution phase 435) where a TA-Command is fetched together with its specific identification or ID tag. In one embodiment, the ID tag is not only a unique identification but also indicates an approximate time it should take to execute the command following program of the identified TA-Command. This expected approximate execution time is determined in step 312 of FIG. 3A. If actual, in-field execution consumes a substantially lesser or greater amount of time than the expected approximate execution time, this anomaly is automatically flagged out for further analysis.

In step 437 the same tagged (identified) Inputs folder is fetched from the plaintext copy of the USB contents. In some cases, no Inputs folder is needed for certain TA-Commands (e.g., one that retrieves all Log Files). In some cases, even if a specific Inputs folder is not provided in the plaintext copy of the USB contents, a default Inputs folder can be automatically generated by the Tech-Assist service 331. If a specific Inputs folder is not provided but is needed and cannot be substituted for by a default Inputs folder, an alarm is generated. Data within respective Input folders are organized in accordance with prespecified expectations of the respective command following programs.

In subsequent step 438, the command following program of the fetched TA-Command is executed based on its associated (tag identified) inputs while the Tech-Assist service 331 monitors the execution and automatically generates an audit trail for the monitored execution.

In subsequent step 439, the results of the executed TA-Command following program are stored in a part of run space allocated for same tagged outputs. The automatically generated audit trail is also saved there.

In subsequent step 440, once the command following program of the fetched TA-Command has finished executing, the executable portions thereof (e.g., linked DLL's) are unloaded so as to provide two outcomes. First, the memory space allocated to them is freed up for re-use. More importantly, the unloading of the executable portions prevents the same specifically identified (tagged) TA-program from running again and generating a conflicting set of output results. The output results of the once run, specifically identified (tagged) TA-program are saved by the Tech-Assist service 331 (together with the optional audit trail) for subsequent storing in encrypted form (see step 433) into the corresponding Outputs folder of the USB storage device. Optionally, the saved plaintext version of the output results of the once run, specifically identified (tagged) TA-program may be needed as inputs for a next executed TA-program. Control then returns to step 431 for fetching a next identification of a next TA-Command that is to be followed.

Figure 3B:
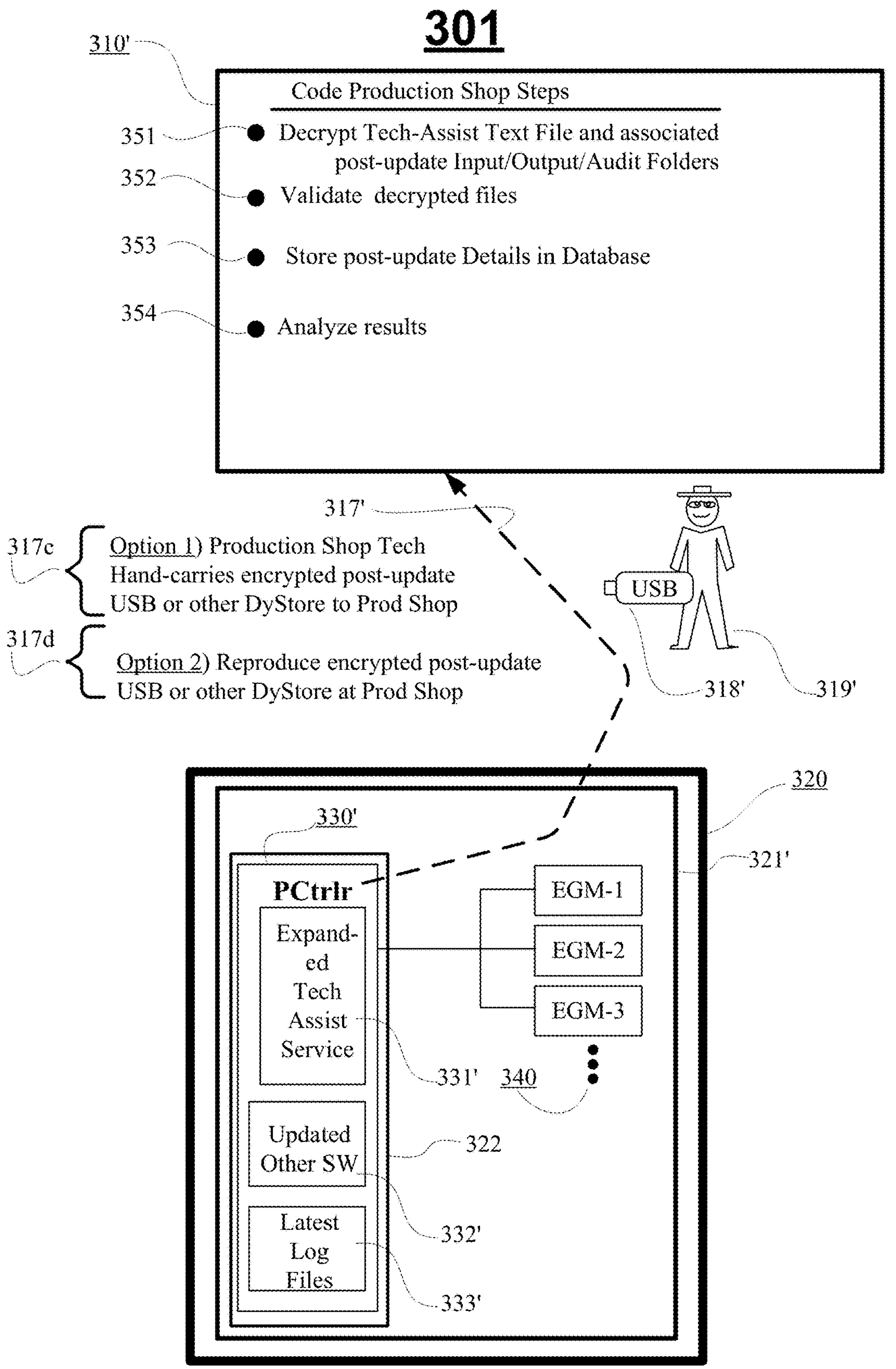
FIG. 3B illustrates a second part of a method in accordance with the present disclosure.

If there are no more TA-Commands to be next followed (automatically repeatedly tested at 432), then control switches to step 433 where the saved plaintext version of the output results of the once run, specifically identified (tagged) TA-programs (and their optional audit trails) are encrypted and stored as encrypted data into the USB storage device 318' (see FIG. 3B). In one embodiment, step 433 also copies the PCtrlr's log (333) of recent TA-programs executed by the TA-service 331. This allows personal at the authorized production shop 310' (see FIG. 3B) to verify that all and only the TA-Commands they had instructed for were actually followed by execution of corresponding command following programs. At step 434, the Tech-Assist service 331 automatically signals the technician 319' that its fully automated tasks are done. The signals to the technician 319' may be accomplished by any one of several means. The progressive controller (PCtrlr) 330 may have an internal sound generating device (e.g., beeper, speaker) that is operated to generate a specific sound that tells the technician 319' the Tech-Assist service 331 has completed its tasks and now needs the technician 319' to unplug the USB (step 436). Alternatively or additionally, the PCtrlr 330 may have an interior screen or other visual output device that can be driven to inform the technician 319' that it is time to unplug the USB (step 436). Alternatively or additionally, the USB storage device 318 may have one or both of audio and optical output components (e.g., a flash-able LED) that can be driven to inform the technician 319' that it is time to unplug the USB (step 436). At step 436 the technician 319' unplugs the USB and control returns to step 412 of the constantly executing Tech-Assist service 331 to await the possible plugging in of a next TA-Commands providing USB device.

Referring back to FIG. 3A, it will now be explained how the TA-Commands providing USB device 319 came into being in the first place. Steps 311-316 all take place within a secured code production shop 310. At step 311, the code creating team within the code production shop 310 creates software changes and/or configuration changes to be made to a given progressive pool controller (PCtrlr) and requests regulatory approval for the created software changes and/or configuration changes. The software changes may include an addition of a new TA-Command to the repertoire of the given PCtrlr or deletion of one. GLI is an example of a regulatory entity that can give such approval but alternatives may be used. Once approval is given and SHA-1's for the approved software/configuration changes are generated, a test-run of the SHA-1 covered changes is performed (step 312) on an in-shop copy of the target PCtrlr using the TA-Commands of that in-shop copy to verify that it runs properly and also to get an estimate of the amount of memory space that needs to be allocated to its execution. In one embodiment, the time of completion (date and time) of the test run is used as a unique identifier or tag for the tested software/configuration changes. This allows for an audit trail back to the time of in-shop creation, regulatory approval and testing. In one embodiment, in-shop copy of the target PCtrlr is not an exact copy in that it has at least one TA-Command not found in the in-casino counterpart (330), that being a TA-TestCommand which is a command to do a test run of a further TA-Command specified in the inputs folder of the TA-TestCommand. In one embodiment, all commands to be executed under control of the Tech-Assist service 331 are named so as to have a predetermined string within their names, for example a prespecified prefix (e.g., "TA-" or "TechAssist"). In one embodiment, all commands to be executed under the TA-service 331 end with or link to an identification tag (e.g., time/date of last successful test run in the code production shop). In one embodiment, all commands to be executed under the TA-service 331 use an IQcommand Interface which is a common code component that contains definitions for groups of related functionalities that class and/or a structures within the command code implementation. The TA-service 331 uses this IQcommand Interface as a way of calling up all or at least some of the methods implemented in execution of the respective TA-program. In one embodiment, upon in-shop compilation of the source code for a respective TA-Command following program, the generated build code is signed for example by a Visual Studio™ project signature and that signature is stored in a TA-CommandSignature.snk file common to the generic version (untagged version) of the respective TA-Command. The project signature constitutes strong name signing that gives its corresponding software component a globally unique identity. Strong names are used to guarantee that the assembly or build cannot be spoofed by someone else, and to ensure that component dependencies and configuration statements map to correct components and component versions. Prior to link-loading, the strong name is checked by the TA-service to verify that the respective TA-Command and its counterpart command following program (TA-program) is a valid one signed by an authorized vendor.

The test run (step 312) also helps to identify the specific input data used by that run and the memory space consumed by the input data and relative locations in memory of the data. In step 313 that input data (e.g., custom input data) is stored in a folder that is identified by the same identification tag as used for the test run of a corresponding TA-Command that uses the input data. The creation and storage of the input data folder (step 313) is optional in that some TA-Commands do not need any input data (e.g., a retrieve all logs command) and/or in that some TA-Commands use default or generic input data that can be obtained or created at the in-casino site 320 and does not need to be provided from the in-shop site 310.

The test run (step 312) also helps to identify the kind of output data produced by that run and the memory space consumed by the output data and relative locations in memory of the output data. In step 314, an outputs folder is optionally created where the outputs folder is identified by the same identification tag as used for the test run of a corresponding TA-Command. The creation of the outputs folder (step 313) is optional in that some TA-Commands do not produce any output data and/or in that some TA-Commands can use a default or generic outputs folder that can be obtained or created at the in-casino site 320 and does not need to be provided from the in-shop site 310. Typically, an outputs folder identified by the same identification tag as used for the test run of a corresponding TA-Command is needed to store at least an audit trail generated at the time of actual running of the tagged TA-Command at the in-casino site 320.

At step 315, a plaintext TA-instructions file is created that specifies the tagged TA-Commands that are to have their corresponding TA-programs executed sequentially one after the other or those that can be run in parallel at substantially the same time.

Figure 3C:
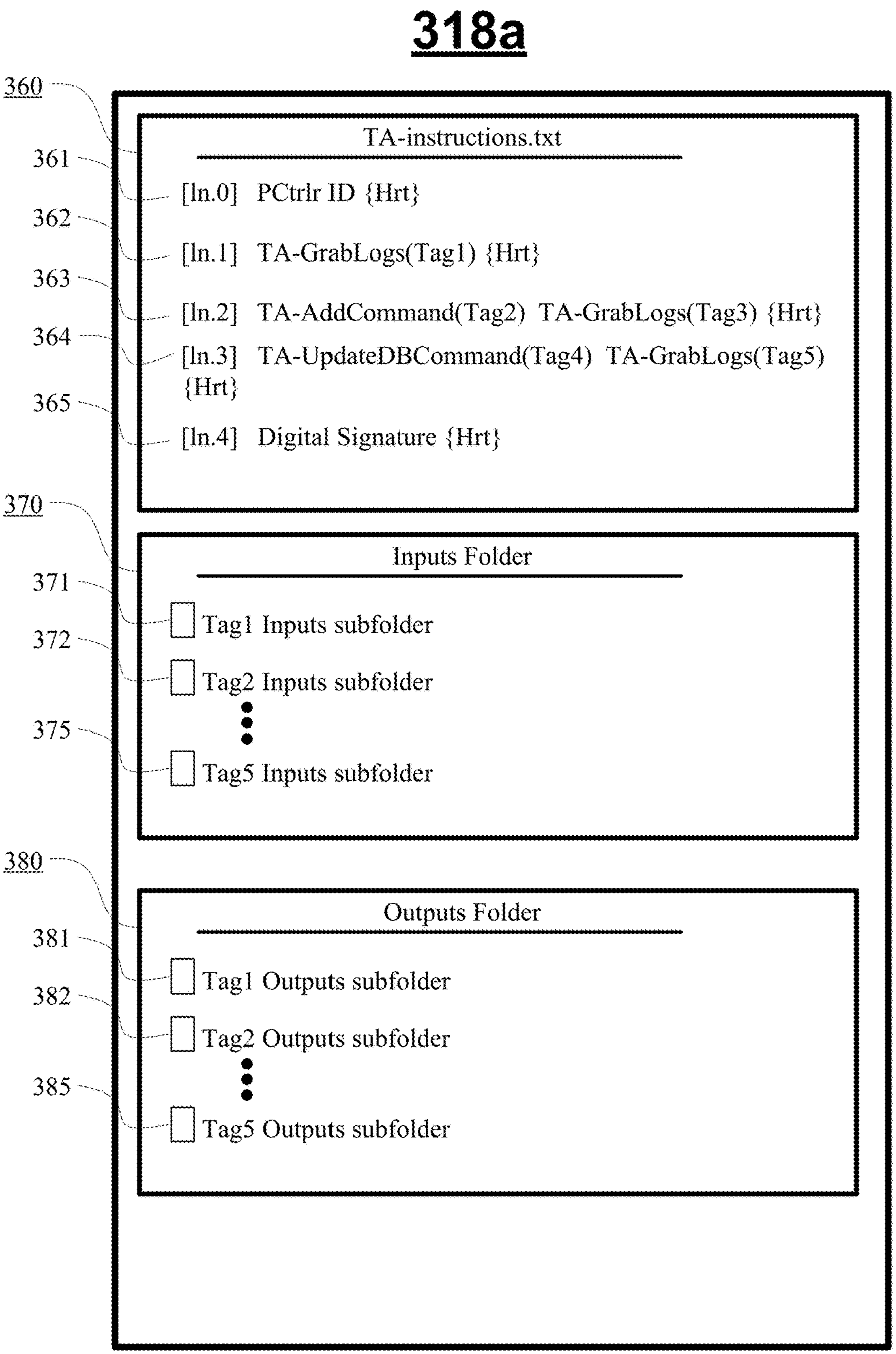
FIG. 3C illustrates a configuration for a pluggable storage device usable with the method.

Referring to FIG. 3C, shown is one example of a plaintext version of an TA-instructions file 360 (named TA-Instructions.txt) that may be used to drive a pre-identified PCtrlr (identified in line 361). The line numbers are optional (e.g., ln.0, ln.1, ln.4). Identification of the targeted progressive pool controller (ln.0) is optional. The TA-Commands providing lines (e.g., ln.1, ln.3) preferably contain only TA-Commands currently recognized by the targeted PCtrlr (e.g., 330 of FIG. 3A). When a new TA-Command is to be added to the targeted PCtrlr (e.g., using an AddCommand command as in line 363) the name and specifics of that new TA-Command appear inside the same tagged inputs subfolder 372 of the tagged AddCommand command (e.g., having a unique identification denoted as Tag2). In the illustrated example, all tagged inputs subfolders (e.g., 371-375) are stored in an inputs main folder 370 located in the root directory area of the corresponding storage device (e.g., USB storage device 318*a*). All tagged output subfolders (e.g., 381-385) are stored in an outputs main folder 380 located in the root directory area of the corresponding storage device. The TA-instructions file 360 is also located in the root directory area. The illustrated configuration of input and output subfolders is merely a nonlimiting example of a possible organization of data within the corresponding storage device (e.g., USB storage device 318*a*). In one alternate embodiment (not shown) separate folders are provided for each identification tag (e.g., Tag1-Tag5) and each such tag-associated folder stores both the input and output subfolders of the respective tag.

In the illustrated example, each text line in the TA-instructions file 360 is terminated by a prespecified terminator symbol (e.g., a hard return character or {Hrt}). Plural TA-Commands which appear in a same text line (e.g., line 363) are to have their respective TA-programs run sequentially one after the other in the order of appearance in that text line. On the other hand, TA-Commands which appear in different ones of the text lines (e.g., in lines 363 and 364) can have their respective TA-programs executed in parallel so as to minimize the amount of time consumed by executing all the TA-Commands specified in the TA-instructions file 360. It is up to the coders at the code shop 310 to determine which TA-Commands need to be executed sequentially and in what order and which can be executed in parallel.

Step 431 of FIG. 4A is automatically repeated for each line in the supplied TA-instructions file, where next means the next TA-Command in the respective commands line and first means the respective first TA-Command found in each respective commands line (e.g., 362-364 of FIG. 3C). More specifically, a respective TA-program for the GrabLogs command in line 362 of FIG. 3C may be formed and launched with its respective and same tagged input and/or output data (e.g., tagged as Tag1) at substantially a same time as a respective TA-program for the AddCommand command in line 363 is formed and launched with its respective and same tagged input and/or output data (e.g., tagged as Tag2). It is within the contemplation of the present disclosure to also have a DeleteCommands command that deletes a specified one or more TA-Commands from the recognized commands list of a specified PCtrlr so those can no longer be obeyed by that specified PCtrlr.

FIG. 3C shows plural TA-Commands having a same generic name but different tags. These may have their respective TA-programs formed and run at different times. For example, the respective Command-following TA-program for the TA-GrabLogs(Tag1) command of line 362 may execute before the respective Command-following TA-program for the TA-GrabLogs(Tag3) command of line 363 and may gather different log information based on its respectively tagged Inputs folder (e.g., 371). The TA-GrabLogs (Tag3) command of line 363 must have it TA-program execute after completion of execution of the respective TA-program for the TA-UpdateDBCommand of line 363 (alternatively referred to as a Tech Assist Database Backup Retrieve command). In one embodiment, such Update Database commands are used for create archive databases for electronic Bingo games on Class III Progressive Controllers and to provide a functionality to retrieve archive databases using the inserted USB drive.

Although FIG. 3C shows a few possible TA-Commands, more generally the TA-Service 331 may be structured to dynamically link-load, launch and then unload a variety of different Command-following TA-programs including, but not limited to, those that update other software (besides the TA-Commands list) in the PCtrlr, those that configure machine features, that retrieve specified files and databases, those that delete old or unwanted files (including DLL's) from the PCtrlr. More specifically, the TA-commands may include Log grabbers that copy one or more of specified log files from a predetermined directory in the PCtrlr (e.g., from cAmts\); Registry grabbers that copy one or more hives from a predetermined registry in the PCtrlr (e.g., from the Cadillac Jack™ registry); Progressive configuration commands that Automatically configure an Electronic Pool Server or Configure a progressive pool; LCI kit installer that installs a Legal Configuration Installer Kit. Yet more specifically, the Updating of the other software can include updating Game Server/Progressive Controller software; Installing hot fixes; Executing database patches. Yet more specifically, the Configuring of machine features can include Configuring progressive settings (via a Progressives Manager); Configuring site settings (via a SiteWizard); Configuring debug levels prior to debug runs. Yet more specifically, the Retrieving of files, databases, etc. can include retrieving specific Logs, Databases and Reports stored in the PCtrlr. Yet more specifically, the deleting of unwanted content can include deleting old and unwanted Log files and/or Database backups stored in the PCtrlr. In one embodiment, the deleting of files, especially old unused or temporary files is performed to free up memory in a system that is running out of free memory space.

Still referring to FIG. 3C, in one embodiment, a digital signature 365 is included in a predetermined location within the inbound USB (the one (e.g., 319 of FIG. 3A) being inserted into the PCtrlr). The digital signature 365 may cover a predetermined one or more parts of the contents of the inbound USB before or after those contents are encrypted. As shown in step 316 of FIG. 3A, all the contents of the inbound USB 319 are encrypted before the USB leaves the secured production shop. This way, if the inbound USB 319 is lost or stolen in transit (317) on its way to being inserted inside the targeted PCtrlr 330, the plaintext information stored therein is not easily exposed.

FIG. 3A depicts two options, 317*a* and 317*b*, for securely transferring the plaintext information stored in the inbound USB 318 (which can be a Flash thumb drive or another form of dynamically connectable and re-programmable storage) into the secured interior of the PCtrlr 330. A first of the options 317*a* has a technician 319 from the production shop 310 personally hand carrying the encrypted USB 319 from inside the production shop 310 to the casino site 320 and personally inserting it into the PCtrlr 330 after unlocking the latter. In one embodiment, the technician 319 does not have to log into the PCtrlr 330. He merely has to insert the inbound USB 318, wait for the completion signal (step 434), unplug it and hand carry the post execution USB 318' (also, the return USB 318') back to the production shop 310'. Thus the technician 319 does not have to be specially trained and does not have to bring any additional equipment to the casino site 320 other than the security keys for opening the cabinet of the PCtrlr 330 and the inbound USB 318. The code production shop 310 saves money and not having to compensate a more highly trained technician to perform the task. The casino 320 saves time and money because the update process is much quicker than conventional ones where a highly trained technician had to attach special equipment to the progressive controller, had to log into the progressive controller and had to step through various menus while performing the task. It is again to be noted that the plaintext version of the contents stored in the in-transit USB 318 are exposed only inside the secured code production shop 310 and inside a secured memory (not shown) of the cabinet-housed PCtrlr 330 (in cabinet 322). Thus, if the in-transit USB 318 is lost or stolen during its forward journey 317 or its return journey 317' (depicted in FIG. 3B), the information inside the USB is not compromised.

In another variation of securely transferring the information inside the inbound USB 318 into the interior and secured memory of the PCtrlr 330, the technician 319 is already stationed at the casino site 320 and does not have to travel from the code production shop 310 to the casino site 320 at the time the inbound USB 318 makes its journey. Instead, personnel at the code production shop 310 placed the encrypted USB 318 in a secured courier package which is then sent by overnight or other courier to the casino site 320 for retrieval by the technician 319 who is already stationed there.

In yet another variation of securely transferring the information inside the inbound USB 318 into the interior and secured memory of the PCtrlr 330, the technician 319 is already stationed at the casino site 320. According to the second option 317*b*, the encrypted contents generated inside the code production shop 310 are electronically transmitted over a communication channel (preferably a secured communication channel) to a USB programming device available to the in-casino technician 319. The technician inserts a blank USB into the programming device and thereby transfers the communicated and still encrypted information into the blank USB. The technician 319 then carries this newly programmed USB onto the casino floor, opens up the appropriate cabinet 322 and inserts the newly programmed USB into the PCtrlr 330. When execution of all the instructed commands is complete, the technician unplugs the USB from the PCtrlr 330, locks the cabinet 322 and brings the unplugged USB to a USB reading communication device (not shown) from which the encrypted contents of the unplugged USB (the return USB 319' of FIG. 3B) are electronically transmitted over a communication channel (preferably a secured communication channel) to the interior of the secured code production shop 310'. The encrypted contents are then decrypted inside the shop and processed as appropriate. In this variation, after receipt of the encrypted contents is validated at the code production shop 310' (see FIG. 3B), the technician 319' may place the unplugged USB into a USB programming device available at the casino site and erase or scramble the contents inside that USB.

Referring to FIG. 3B, return options 317*d* and 317*d* are to be understood as reverse direction counterparts to the various methods described above for transferring the encrypted contents of a USB back to the code production shop 310'. As indicated by the return method 301, once the encryption secured contents of the return journey USB 318' are received inside the code production shop 310', they are decrypted (in step 351) to reveal the plaintext versions of the Tech-Assist instruction file and the associated post-update contents of the input and output folders and of any audit trails that may have been further stored in the USB device 318'. In step 352, the decrypted data is validated by use of digital signature and/or other such techniques. In step 353, the validated post-update information of the decrypted data is stored in a database controlled by the code production shop 310'. In step 354 the results stored in the database are analyzed for various purposes including assuring that all and only those of the TA-Commands in the inbound USB 318 were obeyed by the targeted PCtrlr 330 and that expected output results were obtained.

As indicated in FIG. 3B, in one embodiment, the post-update PCtrlr 330' (denoted by the apostrophe) may have an updated TA-service 331' to which a new TA-Command has been added and to which further new TA-Commands may be later added. The post-update PCtrlr 330' may additionally or alternatively contain updated other software and/or reprogrammed hardware 332'. The latest log files 333' of the post-update PCtrlr 330' may contain log records reflecting execution of the respective TA-programs of the TA-Commands in the TA-instructions file (see 360 of FIG. 3C) and log records reflecting the outcomes of these executions.

Figure 4B:
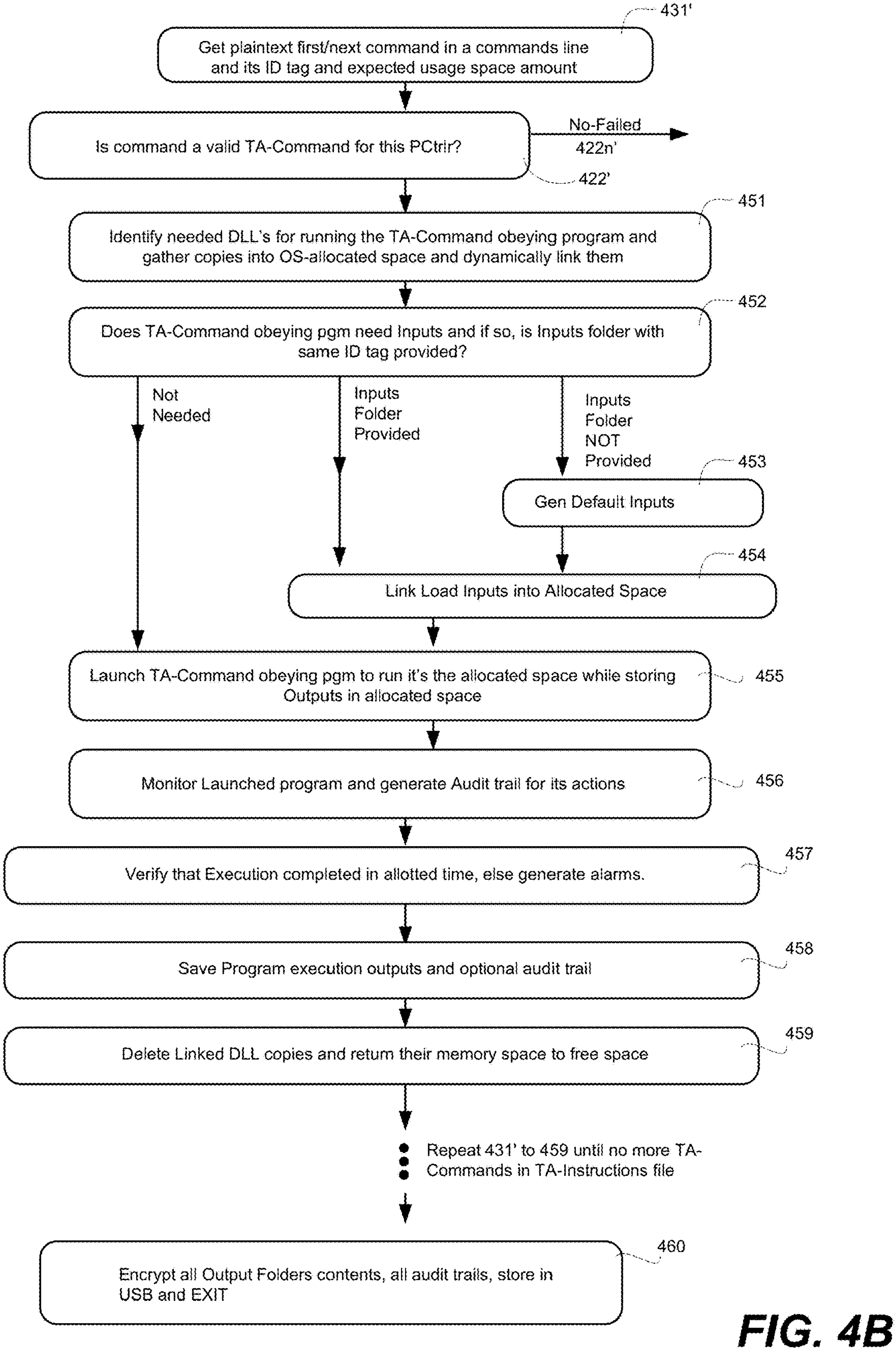
FIG. 4B illustrates a command load and execution method.

Referring to FIG. 4B, shown is a procedure 401 for loading and executing a respective TA-program for a command TA-Command. At step 431' the name of the to-be-executed TA-Command is obtained as a plaintext first or next item in a respective commands line of the TA-instructions file. The identification tag of the to-be-followed TA-Command is also obtained. Other data such as the expected usage space amount and/or expected execution time of the to-be-executed TA-Command is also obtained may be further from inside the TA-instructions file or alternatively from the same-tagged inputs folder. In subsequent step 422', it is determined whether the obtained command name corresponds to a valid TA-Command whose TA-program is executable by the current PCtrlr 330. If not, a failure is flagged by way of exit path 422*n*'. In subsequent step 451 it is determined what one or more dynamically link-loadable software modules (e.g., DLL's) are needed for running the named TA-Command following program. Copies of these link-loadable software modules are gathered (loaded) into a space allocated for execution of the corresponding TA-program and their inter-module links are resolved. By using copies from the DLL library rather than the library-held DLL originals, the process avoids locking up any of the DLL's so that other TA-programs of commands found in other instruction lines may be loaded and executed at substantially the same time (thus minimizing time for completion of all tasks). The identification of which DLL copies are needed for executing the specific, tag-identified TA-Command may be carried out using a predetermined list and/or by using rules within an expert knowledge database that identify the optimal DLLs to use given the current configuration of the target PCtrlr 330.

In subsequent step 452, it is automatically determined whether the to-be-executed TA-program needs input parameters and/or input data (some don't) and if so whether there is an Inputs folder with the same ID tag for providing those parameters and/or input data. If not needed, then control passes to step 455 where the TA-Command following program is launched to run in its allocated private space while storing outputs of that execution in the allocated space (e.g., for later copying into a same-tagged Outputs folder). If the determination at step 452 indicates that an inputs folder is provided, then control advances to step 454 where the provided inputs are link loaded into the allocated space of the to-be-executed TA-program. If a same tagged inputs folder is not provided and yet inputs are needed, then control passes to step 453 where the TA-service 331 automatically generates default inputs for the to-be-executed TA-Command following program. Control then advances to step 454 and then 455.

In subsequent step 456, the TA-service 331 automatically monitors the actions of the launched TA-program and generates an audit trail for all the actions taken by that launched TA-Command following program.

In subsequent step 457, the TA-service 331 verifies that the execution of the launched TA-program terminates in an expected time window (neither substantially too early nor substantially too late) and generates alarms if the expected execution time is not realized.

In subsequent step 458, the TA-service 331 saves the outputs of the completed TA-program and optionally its generated audit trail in a location where the save data can then be transferred over in encrypted form to the return journey USB 318'.

In subsequent step 459, the TA-service 331 automatically deletes (unloads) the link-loaded DLL copies from the allocated space and thereby returns their memory space to free space for use by other processes running under auspices of the OS and/or Hypervisor while preventing the tag-identified specific TA-program from running again.

Steps 431' to 459 are automatically repeated for other TA-Commands until there are no more TA-Commands found in the TA-instructions file for execution. In step 460, the saved outputs and audit trails of the executed TA-Command following programs are encrypted and stored into the return journey USB 318'. A log that recorded the names, identifications and execution times of all the executed TA-programs is also included within the encrypted contents.

Figure 4C:
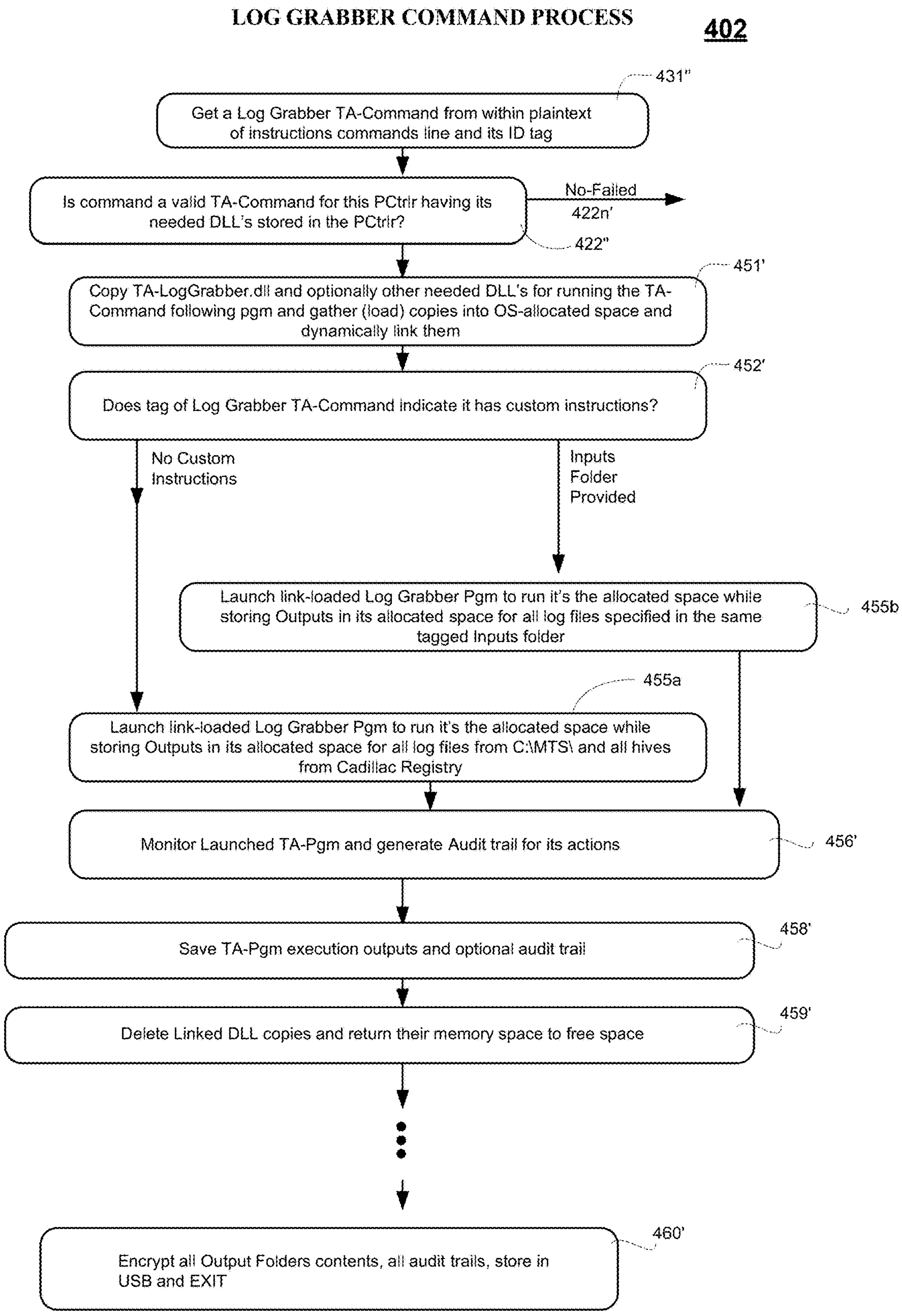
FIG. 4C illustrates a command load and execution method for log retrieval.

FIG. 4C is a similar to FIG. 4B except that it depicts a process 402 for executing a Log Grabber command. In step 431" the name of a log grabber type of TA-command is obtained from the plaintext version of the TA-instructions with its corresponding ID tag. In step 422" the obtained command name is tested to see whether it is a valid TA-command for the current PCtrlr. In step 451' space for executing the respective TA command is obtained from the OS and a copy of a corresponding TA-LogGrabber.dll (DLL) is added to the allocated space together optionally with any other needed DLL's for forming and running the respective TA-program. The gathered (loaded) DLL's are then dynamically linked together (e.g., non-absolute addresses within them are resolved). At subsequent step 452' it is determined whether the obtained TA-command has been provided with an inputs folder based on its ID tag. If no, then a default action is taken at subsequent step **455*a*** such as for example launching the corresponding command following program to grab copies of all log files from a predetermined location within the PCtrlr (e.g., CAMTS\) and also to grab copies of all so-called registry hives from a predetermined registry within the PCtrlr (e.g., Cadillac Jack™ Registry) and placed the copies in the outputs area of the allocated space.

If the answer to test step 452' is yes, then control passes to alternate step **455*b*** in which the link loaded Log Grabber TA-program is augmented with the specific input instructions and/or input data found in its same tagged inputs folder and then formed and launched within its allocated space for storing outputs in the same allocated space of all log files specified in the inputs folder.

At subsequent step 456' (taken after either of steps **455*a* and 455*b*) the launched TA-program is monitored and a corresponding audit trail is generated for all actions taken by the launched TA-program. At subsequent step 458', after execution of the launched TA-program has completed, the resultant outputs and one or more audit trails of the completed TA-program are saved for subsequent encryption and transfer to the return journey USB 318'. At step 459' the allocated space is cleared and returned to the free space area of the system for use by other processes. Later, in step 460', the saved output folder contents and audit trail contents of all the executed TA-programs, including those of the Log Grabber command, are encrypted and stored into the return journey USB 318'. The technician is then signaled to remove the USB and return it (or at least it's encrypted contents) to the code production shop 310'**.

Electronically-assisted games of chance, including those involving progressive pools, have been discussed herein. With respect to the chance providing mechanisms used in such games, it is to be understood that such can include not only mechanical chance providing mechanisms (e.g., mechanical spinning wheel with relatively unpredictable stop position), but also electronically based chance providing mechanisms that can be implemented in the form of digital and/or analog electronic circuits. Such circuits may rely on flip-flops or registers designed with intentional meta-stability and/or on noise intolerant switching circuits that are intentionally exposed to random noise (e.g., thermal noise) so as to provide relatively random and unpredictable outcomes. In one embodiment, an automatically repeatedly actuated code/data verifier is called upon to verify that utilized software and control data use pre-approved hardware, firmware and/or software for properly providing random chances of respective predetermined probabilities at winning and or getting a chance to spin for respective prizes including for respective progressive jackpot pools (e.g., mega-, medium and/or mini-jackpots). Prior art technologies for truly random or pseudo-random picking of outcomes from respective finite outcome sets are too numerous to mention all here. Examples of Random Number Generation (RNG) include Oscillator controlled RNGs, Linear feedback shift register based RNGs; RNGs using Plural parallel outputs bits; Seed value controls for RNGs; Truly random number RNGs; RNGs with Plural parallel outputs, etc. More specific examples of RNGs are provided for example in U.S.

Pat. No. 9,830,130 (Random number generator); U.S. Pat. No. 9,792,089 (Random number generator using an incrementing function); U.S. Pat. No.9,778,913 (Method of generating uniform and independent random numbers); U.S. Pat. No. 9,640,247 (Methods and apparatuses for generating random numbers based on bit cell settling time); USPTO PreGrant 20170262259 (Method for Generating Random Numbers and Associated Random Number Generator); PCT/EP2017/069185 (Quantum Random Number Generator and Method for Producing a Random Number by Means of a Quantum Random Number Generator). A simple example of an RNG is a high speed asynchronous oscillator (e.g., GHz range) driving a wrap-around counter whose counting is stopped or captured by an asynchronous event of substantially slower and unsynchronized timing resolution (e.g. a user pushes a button, background noise is detected, etc.). The output of the stopped/copied counter may then drive an address input of lookup table populated by predetermined outcome values (e.g., playing card symbols) at their respective outcome frequencies. A particular outcome is thereby picked in a substantially random and optionally statistics skewed manner (skewed by the LUT) based on its frequency of appearance within the lookup table.

Referring to FIG. 4A, shown as a non-limiting example is a method 495 of using a random or pseudorandom number generator (RNG) for determining gaming action outcome. At step 496 a counter initializing value is determined as a seed for starting up a wrap-around digital counter driven by a high-speed oscillator. In one embodiment, a pseudorandom generator selects a subset of digits of the system real time clock. The selected digits are combined (e.g., summed) with a predetermined name seed and selected environmental noise measurement (e.g., background radio noise) to form the counter initializing seed. Then at step 497, the seeded counter begins its wraparound count while driven by a high-speed asynchronous oscillator (e.g., one operating in the GHz range). The counter may be a linear counter or a gray coded counter or account or otherwise wired for generating pseudorandom sequences.

At step 498, an external event that occurs asynchronously at a substantially slower rate (e.g., much slower than in the GHz range) is detected and used to trigger a register which captures the current counter value. The register captured value is stored in a temporary and secure memory such as a first-in first-out register (FIFO). In one embodiment, the FIFO is a circular one of limited size whereby unused recorded counts are overwritten by newly captured random count values. At step 500 a request is received for an orangey result and in response the count value at the output end of the FIFO is transmitted to the requester. The transmitted count value is erased from the FIFO.

In step 501 the relatively random RNG result value is applied to a statistics skewing look up table (LUT). The statistics skewing LUT differentially maps various ones of the input random numbers into respective output values or output symbols. Output values/symbols that are to have higher frequencies of occurrence are mapped to more of the input random numbers while values/symbols that are to have lower frequencies of occurrence are mapped to fewer ones of the possible input numbers. For example, in one embodiment the possible output symbols are the fifty-three possible cards in a normal playing card deck. The possible input number set may have thousands of unique members. At step 502, the output of the LUT forms at least part of the gaming action outcome. For example, the LUT output may represent an Ace of spades card. Plural an independent RNG's and LUT's may be simultaneously used for generating respective parts of a gaming action outcome having plural parts (e.g., a five card poker hand). At exemplary output step 503, the symbol represented by the LUT output is displayed for example along a wagered upon line of a set of virtual reel's that are first virtually spun and then slowed to a stop which settles on the predetermined gaming action outcome. Preferably, the RNG's and their associated LUT's are disposed in a secured central enclosure (e.g., 1004) where the graphics for the gaming action are also generated and the graphics are transmitted by secure communication links to the local gaming machines in the respective banks Referring next to FIG. 5B, details of a gaming machine controller that may be used to control the play of wager-based games (e.g., progressive pool games) including generating the game presentations and controlling the various gaming devices is described. FIG. 5B illustrates a block diagram of gaming machine components including a securely housed gaming machine controller (GMC) 1160. The GMC 1160 can be coupled to an external power supply 1146, displays such as 1018' 1012; etc., I/O devices 1134, external non-transient memories, such as a disk drive 1136, a power-off security device 1138, security sensors 1140, communication interfaces 1142 and meters 1144. In one embodiment, the communication interfaces 1142 of the GMC include one or more wired USB receptacles into which a T-commands providing USB storage device may be removably plugged in.

The external power supply 1146 can provide a DC voltage to the GMC 1160. The power supply can also provide power to the other devices in the gaming machine cabinet, such as I/O devices. Typically, the power supply 1146 is configured to receive power from an external power source, such as an AC voltage source. In some embodiments, an uninterruptable power supply (UPS) 1148 can be coupled to the power supply 1146. The UPS 1148 can be configured to provide back-up power for some time period in the event external power is lost. The GMC 1160 includes its own internal and thus securely housed battery 1124 (e.g., a rechargeable battery).

In a particular embodiment, the UPS 1148 communicates with the GMC 1160 on boot up and periodically to indicate power status and battery capacity of the UPS. If the UPS 1148 is not operational, this communication will fail and the game will display a soft tilt on the main game display, such as 1018', indicating that the UPS is not available. Under normal circumstances the UPS 1148 functions to condition the input power and ensure that the UPS battery remains fully charged. However, upon a power failure, the UPS 1148 in conjunction with the game platform will take one of two paths depending on the state of the UPS battery, which are described as follows.

If a power fail occurs and the UPS battery is more that 50% charged the GMC 1160 can immediately determine if there are credits on the machine (The threshold level can be a different percentage). If the game has no credits, the GMC 1160 can immediately hard tilt and become unplayable. The GMC 1160 can continue to run on battery power until either the battery level passes below 50% or power is restored to the game. If power is restored, the hard tilt is cleared and the gaming machine can become playable again.

If credits are on the machine, the GMC 1160 can allow game play to continue until the battery level reaches 50% charge. At that point, the GMC 1160 can complete a game in progress, cash out the player and begin an orderly shutdown. Allowing game play prior to shutting down allows the player to complete a game in progress and continue to remain on the game for a small period of time in case power is restored quickly. This keeps the game from tilting and the GMC 1160 cashing out the player for momentary glitches in power. It also allows some time for backup generators to come on line for a more serious power outage.

The power-off security 1138 can be configured to monitor the security sensors 1140 while power is off to the gaming machine, such as during a power failure or shipping. The power-off security 1138 can include its own processor, memory and power supply, such as the internal battery 1124. The power-off security device 1138 can report detected problems while the power was off to the GMC 1160 after power is restored. In some instances, a detected problem can cause a tilt condition. For example, a detected door open condition while the power was off may cause a tilt condition which has to be cleared by an operator. As another example, if the GMC 1160 can't detect the power-off security 1138, then the gaming machine can tilt.

The I/O devices 1134 can include the gaming devices that are directly or indirectly coupled to the GMC 1160 to provide the external interfaces that allow players to play the wager-based game(s) on the gaming machine. Examples of these gaming devices are described above with respect to FIG. 1. In some embodiments, a memory device 1136, such as disk drive and/or a flash drive, can be provided. As will be described in more detail below, the memory device 1136 can be used as a power hit tolerant memory (PHTM) or used to receive crucial data from another PHTM.

The communication interfaces 1142 can include wired and wireless communication interfaces, which use communication protocols, such as but not limited to Ethernet, Bluetooth™ Wi-Fi, and NFC. A schematic indication of such a wireless communication interface 1046 is shown in FIG. 1. The remote servers (e.g., each server including one or more data processing units such as CPUs and appropriate memory such as SRAM, DRAM, Flash etc.) can form and provide the network services of block 1004 as described above with respect to FIG. 1. The communication interfaces can be used to communicate with remote devices, such as remote servers, mobile devices in proximity to the gaming machine or other gaming machines. The GMC 1160 can be configured to support a variety of communication protocols over these communication interfaces.

In one embodiment, communications can be carried out with a back-end slot accounting system (SAS) (e.g., see network services block 1004 in FIG. 1). In one embodiment, the SAS protocol uses a CRC redundancy check to ensure the integrity of messages going to and from the host. All type S, M, and G Long polls are CRC'd over the entire package including the address and command byte. The SAS engine can be configured to isolate the gaming code from the external communications. The SAS engine can be configured to only accept correctly formed SAS messages. Malformed, invalid or incorrect messages can be summarily dropped. Although CRC is mentioned here as one basis for data integrity validation, it is within the contemplation of the present disclosure to use of numerous other data and code integrity validation techniques including, but not limited to, the above described hash matching technique.

Messages that are valid can be translated into requests for the game player. The result of the message translation can be two-fold. First, the message is parsed and then evaluated for correctness and validity. If the message does not meet this criterion, it may not be translated and forwarded to the game player for a response, such as on display 1026 in FIG. 1. Second, no command, request or message from the external communication interface ever reaches any further than the SAS engine. This process ensures that erroneous signals or data will not adversely affect the game.

The meters 1144 can include hard meters, which are mechanical devices and meters maintained in software by the GMC 1160. In one embodiment, electronic digital storage meters of at least 10 digits that accumulate and store all the meters required can be used. For example, the number of games played since a RAM clear can be accumulated. In a RAM clear, critical memory can be cleared of data. Further, the number of games since the last power-up can be accumulated. As another example, games since the last door close can be accumulated.

Some other functions which may be tracked by a physical or software meter include but are not limited to attendant paid jackpots, attendant paid cancelled credits, bill in, voucher in (e.g., credit voucher), voucher out, electronic fund transfer in, wagering account transfer in, wagering account transfer out, non-cashable electronic promotion in, cashable electronic promotion in, cashable promotion credits wagered, non-cashable electronic promotion out, cashable electronic promotion out, coupon promotion in, coupon promotion out, machine paid external bonus payout, attendant paid external bonus payout, attendant paid progressive payout, machine paid progressive payout, non-cashable promotion credits wagered, number of progressives won, number of jackpots won, number of games won, number of games lost and total amount paid by attendant. Other meters can include main door open, logic door open, cash door open and stacker door open.

In a particular embodiment, software meters can be accessed from an operator menu by turning a key on the side of the gaming machine. The operator menu can be output on one of the displays (e.g., 1018', 1012'). All software meters can be cleared upon a RAM clear. In addition to the meters, the machine can also display the configured denomination, theoretical payout and actual payout. This information is accessible from the operator menu under the statistics screen. This information can be cleared upon a RAM clear event.

The GMC 1160 is preferably mechanically secured within an interior of the gaming machine. For example the GMC 1160 can be contained in a metal box. The metal box can include a secure entry, such as a hinged door, that is lockable. The openings for cables and wiring in the metal box can be purposefully designed to be as small as possible while still allowing proper electrical wiring standards regarding bend radius and connector strain. The locking mechanism for the metal box can be monitored by one of the sensors 1140.

The GMC 1160 can include a motherboard. The motherboard can be the only circuit card that contains control programs. The control programs include those used to control programmable operations within the GMC 1160. Other gaming devices, such as the I/O devices 1134, can include device specific control programs. However, these device specific control programs don't affect or alter the behavior of the control programs on the motherboard. In one embodiment, the control programs are hash protected at install time per the above described techniques and then automatically repeatedly verified periodically or on other event driven bases.

The mother board can include a chipset 1110. The chipset 1110 can include a Northbridge 1106, which is a memory controller hub, and a Southbridge 1108, which is an I/O controller hub. The Northbridge 1106 and the Southbridge 1108 can communicate via an internal bus 1116.

The Northbridge 1106 can be coupled to a memory bus 1112 and a front side bus 1113. The front side bus 1113 can couple on or more processors, such as CPU 1102, to the Northbridge 1106. The CPU 1102 can receive clock signals from clock generator 1104 via the front side bus 1113.

The memory bus 1112 can couple one or more graphics cards, which include graphical processing units (GPUs), to the Northbridge 1106. The graphics card or cards can be installed in the graphics card slot(s). The graphics cards can be coupled to displays, such as display 1018'. Further, the memory bus 1112 can couple one or more memory slots 1115, configured to receive volatile random access memory, to the Northbridge 1102. The CPU 1102 can communicate with the volatile memory in the memory slots 1115 and the graphics card in the graphics card slot 1114 via the memory bus 1112 and the front side bus 1113.

The Southbridge 1108 can be coupled to one or more PCI slots 1118 via PCI bus 1120. In various embodiments, the Southbridge 1108 can provide a variety of communications interfaces. The communication interfaces include but are not limited to IDE, SATA, USB, Ethernet, an audio Codec and CMOS memory. In addition, the Southbridge can communicate with a flash ROM (BIOS) 1126 and super I/O 1128 via the LPC (Low Pin Count) bus 1152. Typically, super I/O 1128 supports older legacy devices, such as a serial port (UART), a parallel port, a floppy disk, keyboard and mouse. Some of the gaming devices, such as the sensors 1140, can be coupled to the Southbridge 1108 via super I/O 1128.

The GMC 1160 can be configured to execute gaming software 1130 to control playing of a respective one or more wager-based games. On boot-up, a self-bootstrapping check of basic hardware, firmware and software integrity 1132 can be performed using firmware logic driven by the BIOS 1126. In a particular embodiment, an isolated and separate hardware device can be installed which includes the boot-up checking algorithms for the basic hardware, firmware and software integrity. The separate hardware device can be coupled to the Southbridge 1108.

In one embodiment, the gaming software 1130 can be stored on two compact flash cards, which are not conventional ROM devices. The verification mechanism can use one or more SHA-1 hashes, which produce a message digest of some length, such as one hundred sixty bits. Message digests can be stored on both compact flash memories. A public/private key covered and/or symmetric key covered algorithm with a key of some length, such as a 512-bit key can be used to encrypt and decrypt the message digests. If any errors are detected in the validation of the gaming software 1130, the GMC 1160 can automatically switch to a tilt mode and halt execution of gaming actions. The GMC 1160 can be configured to prevent programs deemed to be invalid (e.g., those failing periodic verification checks) from running.

When the gaming software 1130 is compiled and built, one or more of its respective code and/or data segments can be hashed using a hash algorithm, such as the SHA-1 hash algorithm. Other hashing algorithms can be used and SHA-1 is mentioned for illustrative purposes only. The resulting hash answers can form the hash digest. This digest, along with the start and stop values for the validation algorithm, can be encrypted by a private key. The key can be stored in a computer which is not connected to any network and which is physically stored in a secure location, such as a locked safe. Alternatively or additionally the above described, secure encrypted SQL database may be used for assuring that decryption keys and/or procedures are not tampered with prior to validating the installed code and/or data segments.

In one embodiment, prior to use, the public key can be installed in a power-hit tolerant memory, such as the NVRAM 1122 on the motherboard. This step can be performed when the gaming machine is manufactured. In another embodiment, the corresponding public and/or symmetric keys can be loaded from a secure mobile memory device, such as an authentication compliant USB device, in the field. In one embodiment, the USB port is only accessible when the enclosure which holds the GMC 1160 is opened. Without a proper public key, the machine will not operate.

When the game initially powers up, the BIOS 1126 can run a Power On Self-Test (POST) and checksum over itself and/or perform other boot-strapping integrity self-checking. If these tests fail, the game does not boot and an operator can be required to clear this tilt. If the BIOS self-test passes, the BIOS can retrieve the public key from NVRAM 1122 and can run a CRC over the retrieved key to ensure it is the correct key. The correct CRC answer can be stored on the BIOS. If the public key does not exist or if the public key CRC returns an incorrect answer, the game can halt and prompt the user to install the correct public key.

Once the public key is validated, the BIOS 1126 can test the integrity of the code stored in the system compact flash 1130 by using the validated public key to decrypt the SHA signatures for the data stored on the system compact flash 1130 and the start and stop sector identifiers indicating where the respective segments of data are stored on the compact flash for each corresponding SHA signature. The data can be stored between the start and stop sectors, inclusive. Unused sectors can be set to 0 (zero). The BIOS 1126 runs a low-level block-by-block integrity check using one or more SHA-1 hashes over the kernel and operating system (Boot and Root) partitions and compares the result to the decrypted file from the manifest. In one embodiment, the operating system can be Linux and the kernel can be a Linux kernel. If any of the hash values does not match, the game automatically goes into tilt mode.

If the values match, the BIOS 1126 can load the now-validated boot loader program and can relinquish control of the validation process to the boot loader. The boot loader can be executed by the operating system using CPU 1102. The procedure can validate the entire partition, not just the file structure. Thus any unused or unallocated areas of the partition can be tested for unintended programs or data.

Next, a file-by-file SHA-1 verification (or other hash based verification) can be performed over the paytable, assets, and player files. The resulting information can be compared against the decrypted results from the manifest file and/or from the secure encrypted database server 2050'. If the calculated answers match the decrypted answers, the GMC will proceed with the boot-up. If the hash answers do not match, the game tilts and requires operator intervention to clear.

In one embodiment, as an additional security measure, a compressed file system that is designed to be read-only can be used. The file system may not support or contain a write command or the ability to write to a file. The file system can be compressed so that it is not human-readable.

Each block of data in the file system can have a corresponding CRC stored with the block. When the block is read, the CRC is calculated and compared with the stored CRC. If the answer does not match, the file system can generate an error and the game tilts. Any changes, whether additions, deletions, or modifications, will change the CRC of the affected blocks and cause the game to tilt. This feature, in effect, monitors the integrity of the entire file system as well as the integrity of the media on a real-time basis. Although CRC is mentioned here as one basis for data integrity validation, it is within the contemplation of the present disclosure to use of numerous other data and code integrity validation techniques including, but not limited to, the above described hash matching technique.

The SHA hash answers can be available on-screen and may also be accessed via the Gaming Authentication Terminal (GAT) interface. The GAT interface (not shown) can be provided as one of the I/O devices 1134 or within the super I/O 1128. The GAT interface can be configured to allow an operator to initiate an SHA-1 hash or an HMAC SHA-1 on-demand so that an operator (or other independent entity) can validate the integrity of the software 1130 at any time. In one embodiment, a nine-pin "D" connector is available to an operator or regulator (e.g., government authorized inspector) for access the GAT serial terminal.

Access to the GAT port requires opening of the main door. Further, it may require unlocking of the GMC enclosure. In one embodiment, a GAT port can be provided on the outside of the GMC enclosure. Hence, the GMC enclosure can remain locked while the GAT port is utilized.

As described above, the gaming machine can include a power hit tolerant memory (PHTM). For example, NVRAM 1122 (nonvolatile memory, for example a RAM coupled to battery 1124) can be used as a PHTM. The PHTM can be used to store crucial data, such as data generated during the play of a wager-based game. The PHTM can be configured to be able to quickly write the crucial data in response to a detection of an imminent power interruption. The CPU 1102 can be configured to detect a potential power interruption via the power interruption signal received from the power supply. The power interruption signal can indicate a fluctuation in the power.

Not all memory types may be suitable for use as a PHTM because their write times are not fast enough to store data between the detection of a potential power interruption and the power interruption. For example, some disk drives don't typically have fast enough write times for use as a PHTM. In one embodiment, a disk drive 1136 can be used. However, it requires that use of an uninterruptable power supply coupled to the disk drive 1136 and GMC 1160 to maintain power after the external AC power source is lost. Other types of memory with slower write times can be employed when an uninterruptable power supply is used.

Typically, a volatile RAM (random access memory) has a fast enough write speed to be used as a PHTM. However, after the power is lost, data stored in the volatile RAM is lost. To overcome this deficiency, a rechargeable battery, such as 1124, can be coupled to the RAM 1122 to provide persistence memory storage. This memory configuration can be referred to as a non-volatile RAM (NV-RAM). The battery power levels can be monitored so that it can be replaced as needed if it is no longer rechargeable. Alternatively or additionally, other forms of nonvolatile memory can be used including for example flash memory, phase change memory, etc.

In one embodiment, an NVRAM 1122 with a battery 1124 is shown inserted in one of the PCI slots 1118. The NVRAM 1122 can be used as a PHTM. In other embodiments, it may be possible to use a RAM inserted into one of the memory slots 1115 that is coupled to a battery. It yet another embodiment, it may be possible to use a high-speed USB connection to a memory storage device to provide a PHTM. As noted above, a hard disk, such as 1136, in combination with an uninterruptable power supply 1148 can be used as a PHTM.

In yet other embodiments, a GMC 1160 may utilize multiple memory storage devices to store crucial data. For example, the NVRAM 1122 can be used as a PHTM. However, crucial data can be copied to a non-PHTM from the NVRAM 1122 as needed. The copied data can provide a back-up of crucial data stored in the PHTM. Further, after crucial data is copied from the PHTM and the validity of the crucial data is verified, it may be deleted from the PHTM to free up space.

In one embodiment, crucial data can be stored in an NVRAM chip and in a high speed read/write compact flash. Crucial data such as RNG outcome, game recall, game state (credits, wager, winnings), and meters can be stored in NVRAM as files. Each file is hashed (MD5 or SHA-1 depending on the file) and the hash answer can be stored with the file and/or stored in encrypted form in the secure encrypted database server 2050'.

Additionally, in a particular embodiment, in NVRAM, the critical files can be kept in triplicate with each copy having a separate MD5 hash of the information. Prior to displaying each game outcome, this data can be rehashed and the three outcomes can be compared. If all three hash answers match, the data is deemed to be good and the game results are displayed to the player and a copy is stored in NVRAM. If two of the sets match, the non-matching set is deemed to be corrupt and it is replaced with a copy from one of the other two and the results are displayed to the player. If all three are different, memory can be deemed to be corrupt and a tilt can occur, halting play. The comparisons can occur continuously, each time the memory is updated, which may be multiple times during the course of a single play. However, a comparison can be performed at least once prior to displaying the game outcome.

To protect meters in the event of a power loss, various meters can be stored in NVRAM 1122. Thus, the meters are protected in the event of a power loss. The battery 1124 can be a lithium cell rated, based on the current draw of the NVRAM, to maintain the meters for at least 90 days. In one embodiment, the lithium cell can be rechargeable via the power supply 1146.

In particular embodiments, a game play history associated with recent games can be stored in the NVRAM 1122. This information can be retrieved from the NVRAM 1122 via an operator menu and output to a display, such as display 1018. In particular embodiments, a complete play history for the most recent game played and the nine prior games can be made available. A method involving game play history is described in more detail with respect to FIG. 9.

For a slot game, the game play history can include credits available, credits wagered, number of lines played (when appropriate), bonuses won, progressive won, game winnings (credits won) and credits cashed out. For "pick" bonuses, the intermediate steps involving the player picks can be retained. In games with free spins, the initiating game is retained with all or, for cases where more than fifty free games have been awarded, at least the last fifty free games played. This gaming information can be displayed in the recall screens through standard text meters, screen shots, graphical display elements and textual representations of specific situations that occurred during game play. The game play history can illustrate unique game play features associated with the game in general and specific game features that occurred during the instantiation of a particular play of the wager-based game.

Figure 6:
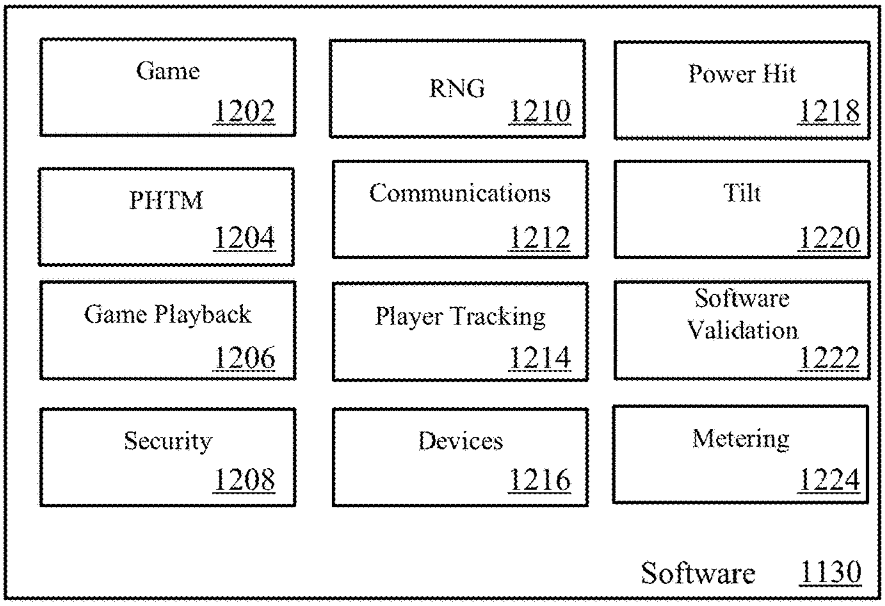
FIG. 6 illustrates a block diagram of gaming software in accordance with the present disclosure.

A gaming machine controller configured to generate a wager-based game in accordance with player selected volatility parameters is described with respect to FIG. 6. Gaming software used to generate the wager-based game is discussed with respect to FIG. 6. With respect to FIG. 7, a power hit tolerant memory configured to store crucial data generated from playing the wager-based game is discussed. The crucial data can include information associated with selected volatility parameters and wager-based games generated using the selected volatility parameters.

Figure 8:
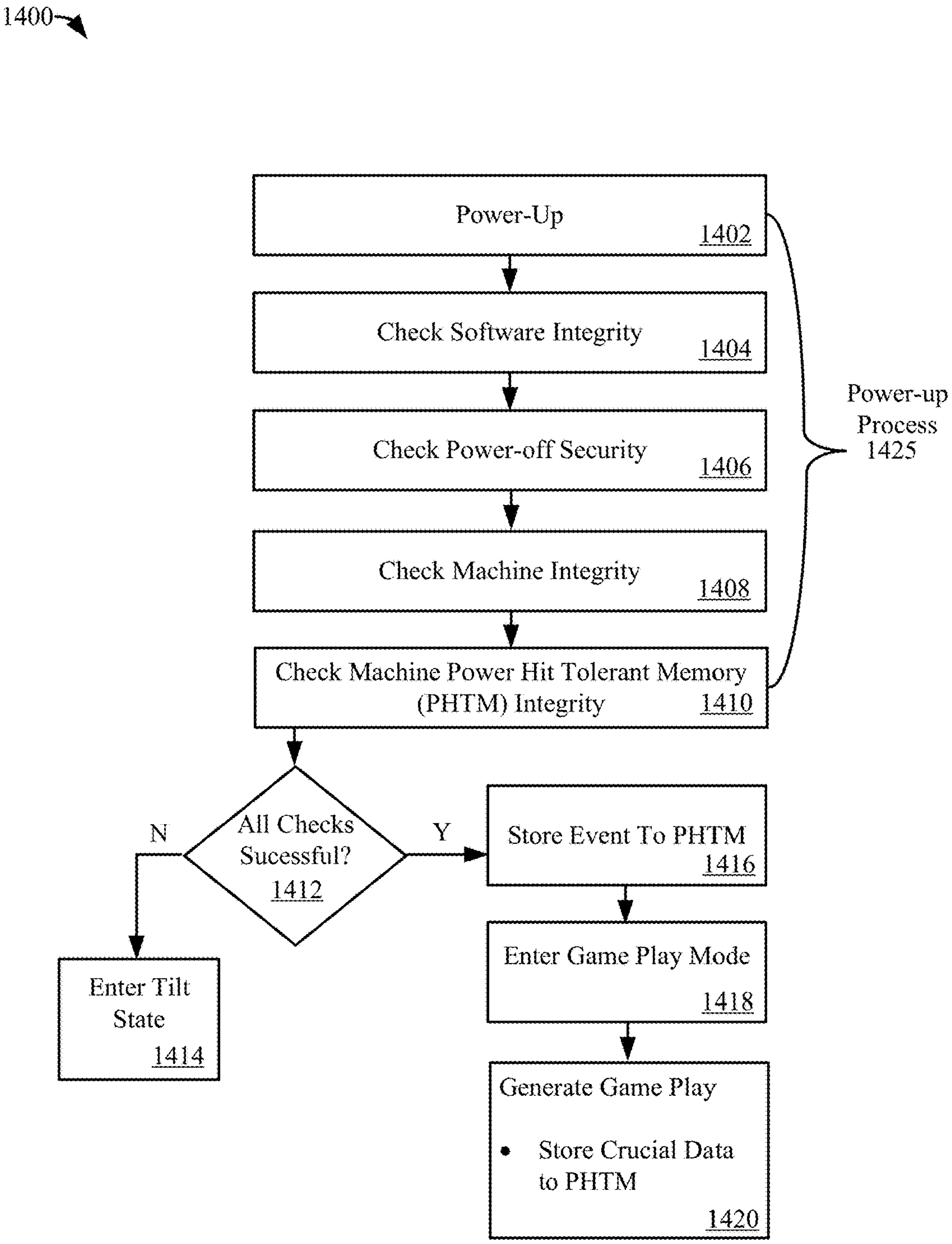
FIG. 8 illustrates a method for responding to a power interruption on a gaming machine in accordance with the present disclosure.

With respect to FIG. 8, a method for responding to a power interruption on a gaming machine, which utilizes the power hit tolerant memory, is discussed. With respect to FIG. 9, a method of powering up a gaming machine is described. Finally, with respect to FIG. 10, a method playing back a game, such as a wager-based game including a first primary game and a second primary game, previously played on a gaming machine is discussed.

FIG. 6 illustrates a block diagram of examples of gaming software 1130 that can be executed by a Gaming Machine Controller (GMC) 1160 in FIG. 5B. The game software 1202 can be configured to control the play of the game. The play of the game includes determining a game outcome and award associated with the game outcome using the RNG software 1210.

The game software 1202 can be configured to utilize reel strips and/or wheels of chance with different properties. For example, virtual reel strips with different total number of symbols, different symbol combinations and different stopping probabilities. As described above, the game software may utilize different virtual reel strips in response to a selection of different prize structures involving scatter distributed symbols.

The award can be presented as a number of different presentation components where a portion of the award is associated with each presentation component. These presentation components can be referred to as game features. For example, for a video slot game, game features can involve generating a graphical representation of symbols moving, settling into final positions and lining up along a combination of different lines (e.g., paylines). Portion of the award can be associated with different lines. In another example, the game features can involve free spins and chance award of bonus wilds during the free spins. In yet another example, the game feature can involve generating a graphical representation of symbol and then actuating a mechanical device, such as wheel to indicate an award portion.

In a further example, a game feature can involve a bonus game where a portion of an award for a game is presented in a separate bonus game. The bonus game can involve inputting choices, such as a selection of a symbol. Similar to the primary game, the bonus game can include bonus game features where bonus game award is graphically presented in a number of different portions. A primary game can include game features which trigger different bonus games with different bonus game features.

As described above, game features and bonus game features can be stored to a power hit tolerant memory (PHTM). The PHTM software 1204 can be configured to manage the transfer of crucial data to and from the PHTM. Further, as described above, the PHTM software 1204 can be configured to verify the integrity of the data stored in PHTM.

In particular embodiments, the game 1202 has no knowledge of PHTM. Thus, the utilization of the PHTM can be totally abstracted from the game 1202 and contained in a shared object that is loaded at runtime. This shared object will also determine if the PHTM is available and how much memory space is available. If there is no PHTM, or it doesn't contain enough memory, the shared object can be configured to automatically use a disk file instead. This function may allow the game to be run in a windows environment and still have the ability to recover from a power hit.

One purpose of the PHTM 1204 is proper recovery from a power hit. In order to facilitate proper power hit recovery, numerous transition points can be built into the game 1202 where crucial data is stored to PHTM at each transition. The transitions can be implemented as states, which can be referred to as game states or game state machines. The states themselves can also be stored in PHTM so that on startup, after validating that the PHTM is not corrupt, the game 1202 can then check the current state that is stored. That state will then determine where the game will restart. The idea is that whenever a state transition occurs and is saved, the data needed to recover to that state has also been stored in PHTM.

Different approaches can be used in deciding when to save data to PHTM. In one embodiment, a thread runs in the background that constantly checks the data in memory against a copy of what's in PHTM as well as a force write flag. If the force write flag has been set or if it sees that the crucial data has changed, PHTM software 1204 writes it to the physical PHTM, updating the copy as well.

In another embodiment, the PHTM software 1204 can be configured to write all data directly to PHTM as it occurs. At certain times the PHTM software 1204 can be configured queue writes rather than committing them in order to make it an "all or nothing" write. This feature can be normally done for something that is going to cause a state change, a cash-out, etc. This feature can allow all the meters or crucial data associated with the game to be written at once, keeping the window of opportunity for corruption to the smallest amount of time possible.

In particular embodiments, multiple state machines can be used that are based on the overall game state machine. For example, separate "sub-state machines" can be used for critical functions that use external I/O devices, such as bill acceptors and printers. If the game 1202 restarts in a state that requires more granularity and has a different state machine such as a cash out or a ticket inserted state, it can switch to that sub-state machine to complete the actions and then return to the overall game state machine.

In particular embodiments, the sub-state machine concept can be used for areas of the game that are outside of the main game flow such as bonus games. For example, if the game is in a bonus game with bonus game feature including a free spin bonus round and the power cycles before all of the free spins have finished, the game will recover to the spin that was being executed when the power cycled and will continue from there. If the game is in a bonus game during a bonus game feature including a pick bonus, the game 1202 can recover to the point where the power cycle occurred. In particular, the picks that have already been made can be displayed and then the bonus game can continue from that point including receiving additional picks. Further, the game 1202 may be configured using the crucial data stored in the PHTM to regenerate on the display all or a portion of the game states prior to the power hit, such as the initial state of the game and game states that occurred prior to the bonus game.

The game playback 1206 can be used to display information associated with one or more game states of a wager-based game previously played on a gaming machine. As an example, a particular wager-based game can be initiated and played on the gaming machine. During game play of the particular game, crucial data associated with game states that occur can be stored to the PHTM. Subsequently, one or more additional games can be played on the gaming machine. Then, using crucial data recalled from the PHTM, game information associated with the particular game can be redisplayed on the gaming machine. The game information can include but is not limited to a) text information, b) screen shots that were generated during game play and c) a regeneration of all or a portion of a graphical game presentation associated with the particular game.

Typically, to access the gameplay back feature, the gaming machine has to be placed in a tilt mode where an operator menu is available. From the operator menu, using game playback software 1206, an operator can select a particular game for playback from among a plurality of games previously played on the gaming machine. To resume normal game play, the tilt mode can be cleared and the gaming machine can revert to a normal operating state. More details of game play back are described with respect to FIG. 10.

The security software 1208 can be configured to respond to information received from various security sensors disposed on the gaming machine and from the power-off security device (e.g., see 1138 in FIG. 4). For example, the security software 1208 can be configured to detect that a locking mechanism has been actuated on the gaming machine and then cause the gaming machine to enter a tilt mode. As another example, the security software 1208 can be configured to receive information from the power-off security device that the gaming machine door was opened while the gaming machine was being shipped. In response, the security software 1208 can cause the gaming machine to enter a tilt state. In yet another embodiment, the security software 1208 may not be able to detect a sensor, such as a sensor (e.g., see sensors 1140 in FIG. 5B) which monitors a state of a door and in response enter a tilt state.

The RNG software 1210 can be configured to generate random numbers used to determine the outcome to a wager-based game. In one embodiment, a Mersenne twister random number generator (RNG) algorithm, which generates integers in the range [0, 2^k−1] for k-bit word length with a period of (21 \19937)−1 can be used. It has a longer period and a higher order of equi-distribution than other pseudo-random number generators. The Mersenne Twister is also very fast computationally as it uses no division or multiplication operations in its generation process. It can work well with cache memory and pipeline processing.

In particular embodiments, the RNG cycles at seventy RNG cycles/second or above, such as equal to or above one hundred RNG cycles/second. This speed has been determined by engineers at the Nevada Gaming Control Board to be fast enough that it cannot be timed by the player. The tests showed that above seventy RNG cycles/second successfully hitting a specific outcome became sporadic, and the results were completely unpredictable at one hundred RNG cycles/second. An evaluation showed the variance in the contact mechanism of mechanical switches and the inherent variance in the "button press" detection circuitry, combined with the inability of a person to repeat a movement, provided enough ambiguity in the final registration of the button press to eliminate a player's ability to affect the payback characteristics of the game.

The RNG can be seeded using a plurality of variables. In particular embodiments, the RNG can be seeded by four variables that eliminate the same seed sequence from being used in more than one device, such as two gaming machines using the same RNG seed. The variables can be 1) absolute time, 2) time since the machine powered up, 3) machine number and 4) a random number from the kernel base RNG "/dev/urandom." The random number from the kernel can be associated with the Linux Kernel. This RNG "/dev/urandom" can be based on random occurrences, such as times between keystrokes, mouse movements, timing between interrupts, and hardware occurrences. These occurrences can be used to build and maintain an entropy pool.

The system protects against the same sequence in several ways. First, even if two games are powered on at exactly the same time, there is enough variability in the exact time that the time since power up should prevent any two games from having the same number returned from this function. Also, the "urandom" RNG is entropy based, and is self-seeded from environmental noise contained in the kernel, which makes it unlikely that two machines would ever have the same seed. Finally, the machine number (EPS number) is used as part of the seed. Because this number is used to uniquely identify the gaming machine on the floor, it should always be different from any other machine.

The communications software 1212 can be used to provide communications via the various communication interfaces and using various communication protocols. For example, the communications software 1212 can support the SAS protocol over wired or wireless communication interfaces. In another example, the communication software may allow the gaming machine to communicate with a mobile device via a wireless communication interface using a Bluetooth™ protocol.

The player tracking software 1214 may allow the GMC to communicate with a player tracking device installed on the gaming machine and/or directly with a remote server which provides player tracking services. For example, a player tracking device can be configured to communicate a GMC to transfer credits to and from the gaming machine. In another embodiment, the GMC can be configured to receive player tracking information from a card inserted in a card reader (e.g., see 1028 in FIG. 1) or via wireless communications with a player's mobile device. Then, GMC can communicate with a remote server to receive information associated with a player and send information associated with the player's game play on the gaming machine.

The devices software 1216 may be used to allow the GMC to communicate with various devices coupled to the gaming machine, such as I/O devices coupled to gaming machine. For example, the devices software may allow the GMC to communicate with a bill acceptor (e.g., see bill acceptor 1024 in FIG. 1) and in response add credits to the gaming machine. In another example, devices software may allow the GMC to communicate with a printer (e.g., see printer 1022 in FIG. 1) and in response cash out credits from the gaming machine in the form of printed ticket.

The power hit software 1218 can allow GMC to respond to power hits. For example, the power hit software can monitor the power supply and in response to a detection of power fluctuations update the PHTM with crucial data. In another example, when the gaming machine is power-up from a power hit, the power hit software 1218 can determine the power hit occurred during game play and initiate a restoration of the gaming machine to its state when the power hit occurred.

The tilt software 1220 can be configured to monitor sensors and gaming devices for tilt conditions. In response to the detection of a tilt condition, the tilt software 1220 can cause the gaming machine to enter a tilt state. Further, the tilt software 1220 can record tilt information to the PHTM.

For example, when a machine door open is detected, the game can tilt with a hard tilt that prevents play and disables the game. If the gaming machine includes a tower light, the tower light can flash to indicate that a door is open. Further, a "DOOR OPEN" indication can be displayed on the main display screen. Upon a detection of the door closing, the tower light can stop flashing and the "DOOR OPEN TILT" can be replaced with a "DOOR CLOSED SOFT TILT."

The door open tilt condition can be the behavior for all the machine doors, such as door 1014 in FIG. 1 or a CPU enclosure door (not shown). Additionally, the behavior may not change for multiple doors that are open. Thus, the "DOOR OPEN" indication can remain on, and the machine will be disabled until all the doors are closed. After the final door is closed, the tower light can go off, the game can become playable and the "DOOR OPEN" indication can be written over by a "DOOR CLOSED" indication which will remain until the end of the next game cycle.

A number of tilts can be generated that must be cleared by an attendant. These tilts may include clearing the condition with a key switch or, for tilts such as "PAPER OUT," the tilt may clear automatically after the attendant has remedied the malfunction. A low battery for a PHTM (e.g., see NVRAM 1122 in FIG. 4 or 1204 in FIG. 5) can be indicated by a "RAM BATTERY" tilt.

A "PRINT FAILURE" tilt can occur when there is a failure to print a ticket. In response, a printer hard tilt error can be issued and the description will indicate that the printer is offline. The tilt can be cleared when the printer is brought back online.

A "PRINT MECHANISM/PAPER JAM" tilt can occur for a paper jam. The game can indicate the paper jam has occurred and the printer is off-line (e.g., see printer 1022 in FIG. 1). This tilt can be cleared by clearing the jam and reinserting the paper into the printer.

A "PAPER OUT" tilt can occur when the printer runs out of tickets (e.g., see printer 1022 in FIG. 1). In response to detecting no remaining tickets, the game can display information indicating no paper is available and the game can be disabled. This tilt can be cleared when new printer stock is fed into the printer.

A defective storage media tilt can occur when an error is detected in a critical memory device, such as the memory storing the game software (e.g., see 1130 in FIG. 4), the memory storing the BIOS (e.g., see BIOS 1126 in FIG. 4) or the PHTM storing crucial data (e.g., see NVRAM 1122 in FIG. 4). A message indicating the validation error can be displayed. This tilt may require a "RAM CLEAR" to remedy the tilt condition. A "RAM CLEAR" can erase all meter, recall and other critical memory.

As described above, multiple copies of crucial data can be stored in the PHTM (e.g., see NVRAM 1122 in FIG. 4) and the GMC (e.g., see GMC 1160 in FIG. 4) can be configured to detect and correct copies of faulty data. When uncorrectable memory is detected in the PHTM or another device, it can result in a "CRITICAL MEMORY ERROR" tilt. Again, this tilt can require a "RAM CLEAR" to remedy the condition. Again, the "RAM CLEAR" can erase all meter, recall and other critical memory.

A "BILL JAM" can occur when the bill acceptor detects a bill jam (e.g., see bill acceptor 1024 in FIG. 1). The tilt condition can be displayed on the display, such as main display 1018 in FIG. 1. This is a hard tilt which disables the game until an operator clears the bill jam condition.

When a stacker is full, the game can displays a soft tilt error on the main screen. A "stacker full" may be displayed as a security measure. The stacker can be coupled to a bill acceptor and located in the main cabinet of a gaming machine (e.g., see bill acceptor 1024 in FIG. 1). The game can remain playable but will not accept any further currency or tickets. This tilt is automatically cleared once the stacker is emptied or replaced. When the stacker is removed, the game will be disabled and display a "STACKER OPEN" message. This tilt can be cleared when the stacker is reinserted.

The software validation software 1222 can be executed by the CPU to validate the various software components on the gaming machine. For example, hashes of memory blocks can be performed and compared to stored hash values (e.g., stored in encrypted form in the secure encrypted database server 2050'). This software can differ from the validation logic which is executed separately by the BIOS to perform validation functions.

The metering software 1224 can be used to update the hard meters and generate and update the soft meters. The metering software 1224 can be configured to store metering information to the PHTM (e.g., see NVRAM 1122 in FIG. 5B). Examples of the meters which can be maintained are described above with respect to meters 1144 in FIG. 5B.

Figure 7:
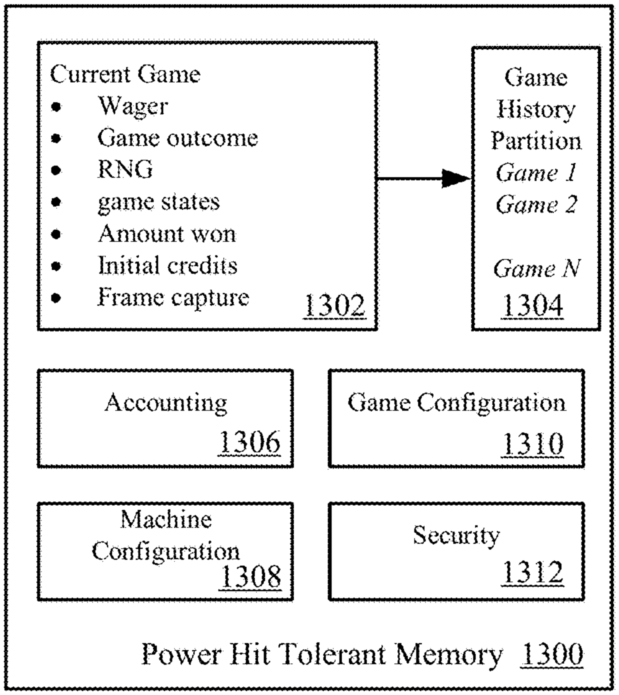
FIG. 7 illustrates a block diagram of power hit tolerant memory in accordance with the present disclosure.

FIG. 7 illustrates a block diagram of one embodiment of a power hit tolerant memory (PHTM) (Additional details of PHTMs are described with respect to NVRAM 1122 in FIG. 5B and PHTM 1204 in FIG. 6). Crucial information associated with the current game can be stored in 1302. Some examples of crucial information include but are not limited to a wager amount, a game outcome, one or more random numbers to determine the game outcome, information about game states and sub-states including the current game state, an amount won, initial credits and frame captures associated with one or more states. As described above, this information can be used to return the game to a current state after a power-hit. The one or more random numbers can be used to regenerate a particular game outcome associated with the random numbers and the wager amount.

After a game is completed, it can be moved to a game history partition 1304. The game history partition can store crucial data associated with a plurality of previously played games. For example, in one embodiment, the PHTM 1300 can be configured to store crucial data associated with the current game and nine past games. In another embodiment, the PHTM 1300 can store information associated with up to one hundred past games.

When the maximum number of games in the game history partition is reached, the software which manages the PHTM 1300 can be configured to delete the oldest game. This process can occur prior to starting the next game. For example, if a maximum of ten games are stored in the game history 1304, then prior to the play of the eleventh game, the oldest game can be cleared from the memory. In one embodiment, prior to the deletion of the crucial data associated with the oldest game, it can be copied to a secondary persistent memory.

In 1306, accounting information can be stored. The accounting information can include the metering information previously described above. In some embodiments, this information can be recalled in the event of a power failure.

In 1308, machine configuration information can be stored. Some example of machine configuration information can include but is not limited to Manufacturer ID, date of manufacturing, machine ID, operating system version, number of screens, cabinet type, hard disk capacity, PHTM capacity, number of PHTM banks, printer model information, touch screen model information, card reader model information, bill acceptor model information, display model information, jurisdiction information, casino name and other information, sales order #, manufacture information, logo's, etc. In one embodiment, the public key used in the code validation process can be stored here.

In game configuration 1310, game configuration information can be stored. The game configuration information can include paytable selection, game features selections, bonus selections, jackpot contribution setting, denominations, max number of paylines, number of game titles and game versions. A gaming machine can have many paytables with different holding percentages which can be selected by the casino. Similarly, selectable game features and bonus features can be provided.

In security 1312, security information can be stored. Security information can include information that lead to a tilt condition and the associated tilt condition. For example, if a door is opened, the security information can include when the door was opened, when game play was disabled, when the door was closed, when the tilt condition was cleared and when game play was subsequently enabled.

FIG. 8 illustrates a machine-implemented automated method 1400 for responding to a power interruption on a gaming machine. In 1402, the gaming machine can begin a power-up process 1425. The power-up process can begin when a power switch in the interior of the gaming machine is turned on or when power is restored after a power interruption. In response to detecting external power is available, a signal can be generated which initiates a software integrity check on in 1404.

In 1404, the software integrity on the gaming machine can be checked. In particular embodiments, a public key/private key method and a "ladder of trust" can be used to verify control programs executed by the game controller. The initial rung of the ladder of trust can be the BIOS EPROM (see 1126 in FIG. 5B), which may be a conventional ROM device. This conventional ROM device can load and can verify the initial code which continues the "verify then load" ladder of trust until the entire operating system and the game is loaded. This process was described above in detail with respect to FIG. 5B.

In 1406, the power-off security device (see 1138 in FIG. 5B can be checked. The power-off security can monitor all the doors in the EGM. For example, the doors can use optical emitter/sensor pairs, but some might also use Hall-effect sensors. The system can be a standalone device with a CPU, RAM, NVRAM, sensors I/O board, and battery. The battery can be configured to last at least 30 days. It can be configured to record all critical events, such as power brown out, power black-out, main door open, logic (CPU) door open, bill acceptor door open, printer door open, top box door open and player tracking door open. These critical events may have occurred while the GMC was shut down and hence not monitoring the gaming machine for critical events.

In 1408, the machine integrity can be checked. For example, the security sensors on the gaming machine can be checked to verify all the doors are closed. Further, gaming devices, such as the printer and the bill acceptor, can be checked to determine the devices are operating properly (e.g., see printer 1022 and bill acceptor 1024 in FIG. 1).

In 1410, critical memory on the gaming machine can be checked. For example, the PHTM can be checked to make sure the stored information matches associated hash values. As described, a hash value can be generated for crucial data stored in the PHTM. The hash values can be stored with the crucial data. When the PHTM integrity is checked, new hash values can be generated and compared to the stored hash values.

In 1412, the GMC can determine whether all the checks were successful. If one or more of the checks are not successful, in 1414, the gaming machine can enter a tilt state and game play on the gaming machine can be disabled. Information about the tilt state can be output to a display, such as the main display on which a gaming presentation for a wager-based game is output.

In 1416, when all the checks are successful, event information associated with the successful power-up process can be stored to the PHTM. For example, the time that the gaming machine was enabled for game play can be stored to the PHTM. In one embodiment, as described above, this information can be used to generate a seed for a random number generator used on the gaming machine.

In 1418, the gaming machine can enter game play mode. Thus, the gaming machine is enabled to accept bills and tickets that are redeemed for credits on the gaming machine. After credits are deposited, the gaming machine can be used to make wagers on the game(s) available for play on the gaming machine. In 1420, the GMC can generate wager-based game play on the gaming machine and store crucial game play data to the PHTM.

Figure 9:
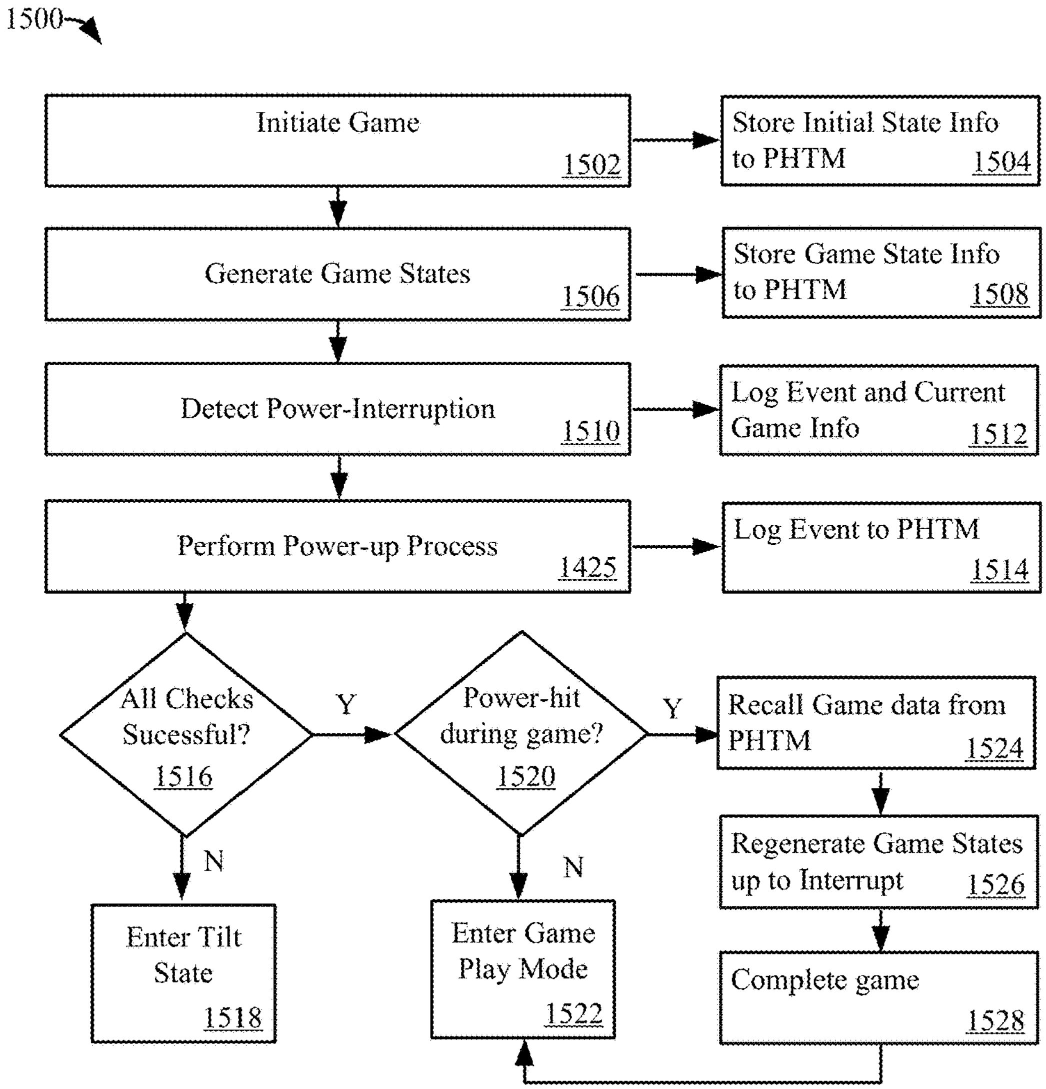
FIG. 9 illustrates a method powering up a gaming machine in accordance with the present disclosure.

FIG. 9 illustrates a method 1500 powering up a gaming machine. In 1502, a wager can be placed and a game can be initiated. In 1504, initial state information associated with the game can be stored to the PHTM. In 1506, game states associated with the game can be generated. In 1508, crucial data associated with the game states can be stored to the PHTM.

In 1510, a power-interruption can be detected. For example, the GMC can receive a signal from the power supply which indicates a power spike associated with a power shutdown has occurred. In 1512, the event can be logged to the PHTM. In addition, current game state information can be logged to the PHTM prior to the power failure. After power is lost, the GMC may no longer operate unless an uninterruptable power supply is available.

In 1425, the power-up process in FIG. 9 can be performed. In 1514, this event can be logged to the PHTM. In 1516, whether the power-up process is successful can be checked. In 1518, if the check is not successful, the gaming machine can be placed in a tilt state and information about the tilt state can be output.

In 1520, a check can be performed to determine whether the power-hit occurred during the play of a game and prior to completion of the game. This information can be stored in the PHTM. In 1524, when the power-hit occurred during the play of a game, data associated with the game including the current game state can be retrieved from the PHTM. In 1526, the game can be regenerated up to the current game state just prior to the power hit. In some embodiments, the gaming machine can be configured in the current game state without showing any information leading up to the current game state. In other embodiments, one or more game states prior to the current game state can be regenerated and output to the display.

In 1528, the current game can be completed. In 1522, the game can be enabled for game play. In 1520, when the power-hit didn't occur during play of a game, the gaming machine can be powered-up and enabled for game play in 1522.

Figure 10:
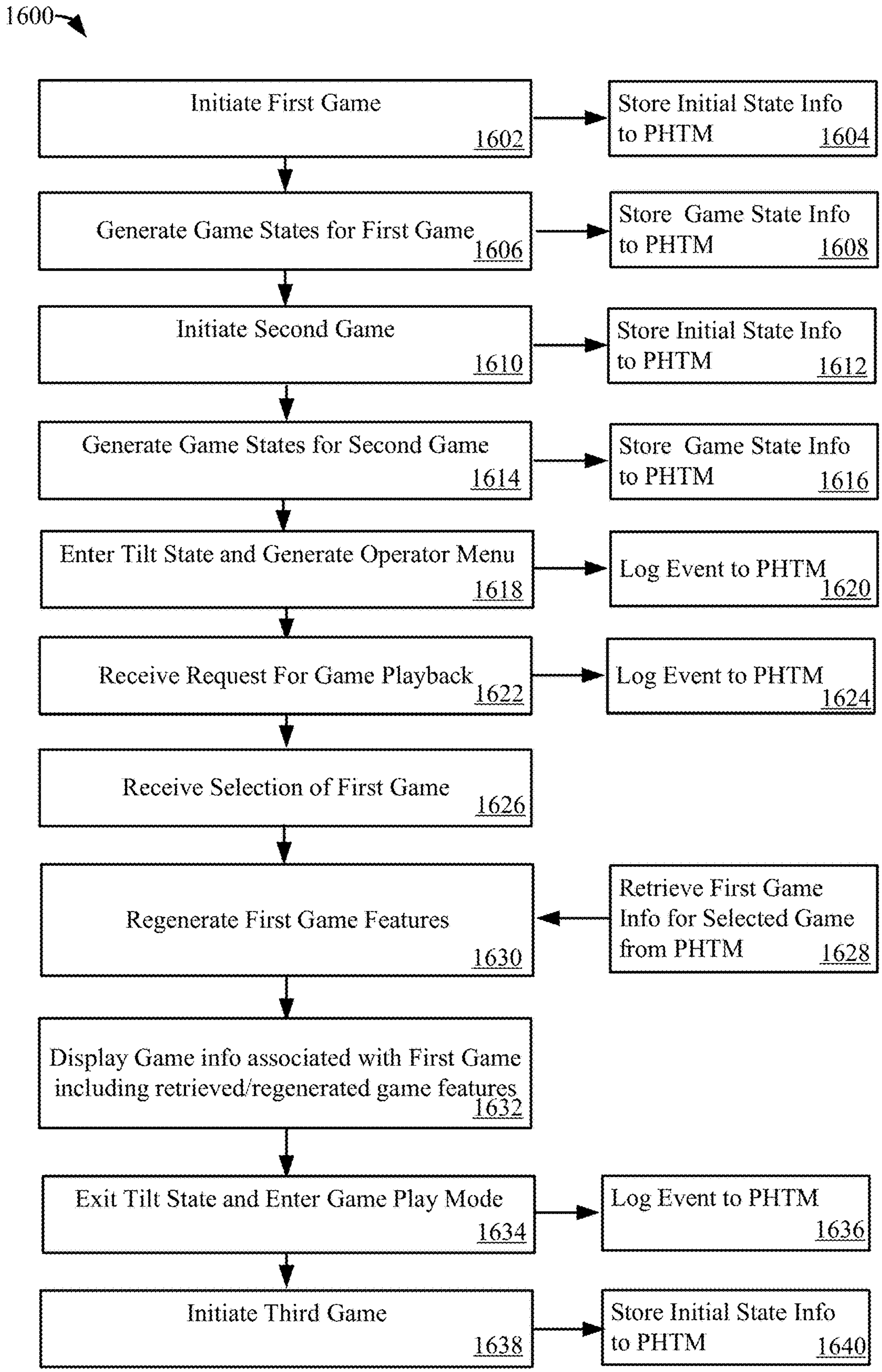
FIG. 10 illustrates a method playing back a game previously played on a gaming machine in accordance with the present disclosure.

FIG. 10 illustrates a method 1600 playing back a game previously played on a gaming machine. In 1602, a first game can be initiated on the gaming machine. In 1604, initial state information about the first game can be stored to the PHTM. In 1606, game states for the first game can be generated. In 1608, the game states can be stored to the PHTM. As described, in the event of a power-hit during play of the first game, the GMC (e.g., see GMC 1160 in FIG. 5B) can be configured to restore the game and the gaming machine to a game state just prior to the power hit using information retrieved from the PHTM (e.g., see NVRAM 1122 in FIG. 5B).

After the completion of the first game, in 1610, a second game can be initiated. The initial state information for the second game can be stored to the PHTM (e.g., see NVRAM 1122 in FIG. 5B). In 1614, the game states for the second game can be generated and the second can be brought to completion. In 1616, the game state information for the second game can be stored to the PHTM.

In 1618, the gaming machine can enter a tilt state. In one embodiment, the tilt state can be initiated in response to the operator inserting and turning a key in a locking mechanism on the outside of the gaming machine cabinet. Then, an operator menu can be generated and output to a display on the gaming machine. In 1620, the tilt state event can be logged in the PHTM.

In the 1622, the gaming machine using an input device, such as a touch screen, can receive a request for a game playback. The game playback can involve displaying information about a game previously played on the gaming machine. In 1624, this event can be logged to the PHTM. In 1626, a particular previously played game can be selected from among a plurality of games with game information stored in the PHTM. In this example, the first game played is selected.

In 1628, game information associated with the first game is retrieved from the PHTM. Some examples of game information which can be retrieved includes but are not limited one or more of random numbers used to generate the first game, screen shots, award information, bet information, credit information and screen shots from one or more game states.

In 1630, first game features can be regenerated. These game features can include animations of the play of the game, which represent one or more game states, or static images representing different game states. The animations of the play of the game can be regenerated using random numbers associated with the original play of the first game.

In 1632, game information associated with the first game, including the retrieved screen shots, regenerated static images and regenerated animations, can be output to a display on the gaming machine. In one embodiment, the display can be the display where the game presentation for the wager-based game is output (e.g., see display 1018 in FIG. 1). In 1634, the gaming machine can exit the tilt state and enter game play mode. For example, to initiate this process an operator can turn a key in the locking mechanism and remove it from the locking mechanism.

In 1636, initiation of game play can be logged as an event to the PHTM. In 1638, a third game on the gaming machine can be initiated. In 1640, the initial state information associated with the third game can be stored to the PHTM.

Because such information and program instructions may be employed to implement the systems/methods described herein, the present disclosure relates to tangible (non-transitory) machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure. As used herein, the term "and/or" implies all possible combinations. In other words, A and/or B covers, A alone, B alone, and A and B together.

With respect to any material incorporated herein into by reference, it is to be understood that if there is conflict between the incorporated material and the present disclosure, the present disclosure controls. If there is conflict between two or more of the incorporated materials, the later dated one controls.

While the present disclosure has been particularly shown and described with reference to specific embodiments thereof, it will be understood by those skilled in the art that changes in the form and details of the disclosed embodiments may be made without departing from the spirit or scope of the present teachings. It is therefore intended that the disclosure be interpreted to include all variations and equivalents that fall within the true spirit and scope of the present teachings.

What is claimed is:

1. A gaming machine system comprising;

one or more secured first housings each having a respective and normally locked first entry that provides physical access to an interior of the respective one among the first housings upon unlocking of the respective first entry; and said gaming machine controller configured to manage one or more gaming activities of the gaming machine system, the gaming machine controller having one or more secured processors and a secured memory storing secured data, all disposed within the interior of a first housing among the secured first housings, the gaming machine controller connecting to an I/O receptacle also disposed within the interior of the first housing;

wherein the gaming machine controller stores in the secured memory thereof a predetermined set of recognizable commands and is programmed to repeatedly run among executing processes of its one or more secured processors, a service configured to detect association of one or more of the predetermined set of recognizable commands with the gaming machine which, when implemented, effectuate access to said secured data within the secured memory for updating said secured data, the secured data not being permitted to be accessed remotely from outside the first housing while the respective first entry of the first housing is locked;

where in its repeated executions, the service:

first checks for insertion of a dynamically-linkable and reprogrammable storage device into the I/O receptacle;

second checks, in response to a detection of insertion of the storage device into the I/O receptacle, for encrypted data stored on the inserted storage device;

decrypts said encrypted data and stores said decrypted data in said secured memory;

third checks said decrypted data stored in said secured memory for the presence of one or more commands that correspond to the stored predetermined set of recognizable commands;

launches, in response to a detected presence of the one or more commands, respective executing programs in the gaming machine controller that, without input by a technician, access the secured data in accordance with implementing respective ones of the recognizable commands detected within the inserted storage device to update the secured data in the secured memory;

generates information regarding the outcomes of the executing programs;

encrypts the outcome information and then saves the encrypted outcome information into the inserted storage device; and signals, in response to completion of the implementation of the recognizable commands stored within the inserted storage device and in response to completion of saving of the results, that the inserted storage device can be removed.

2. The gaming machine system of claim 1 and further comprising:

a secured housing disposed within the interior of the secured first housing and securely containing the gaming machine controller behind a respective second entry into the secured second housing, the second entry being lockable and providing physical access to the gaming machine controller upon unlocking.

3. The gaming machine system of claim 1 wherein:

before launching a respective one of the programs for implementing a corresponding one of the stored commands, the service allocates memory space in the secured memory for executing the respective one program and loads into the allocated memory space, corresponding code and data for executing the respective one program; and after loading the code and data the service executes the loaded one program.

4. The gaming machine system of claim 1 wherein:

the secured first housing securely contains other secured programmable hardware in addition to the one or more secured processors and the secured memory, the other secured programmable hardware being reconfigurable by actions of the gaming machine controller.

5. The gaming machine system of claim 1 wherein:

the storage device has a dedicated instructions storage area for storing commands; and the third checking verifies that commands stored in the dedicated instructions storage area are only those of the predetermined set of recognizable commands.

6. The gaming machine system of claim 5 wherein:

The third checking verifies that the dedicated instructions storage area contains only text (txt) encoded data.

7. The gaming machine system of claim 5 wherein:

the storage device has a dedicated inputs storage area from which respective implementations of the commands stored in the dedicated instructions storage area can draw input data for respective implementations of those of the commands that need such input data; and the service is configured to use the dedicated inputs storage data to draw input data for its respective implementations of those of the commands that need such input data.

8. The gaming machine system of claim 5 wherein:

the storage device has a dedicated outputs storage area into which respective implementations of the commands stored in the dedicated instructions storage area can write respective output data for respective implementations of those of the commands that produce such output data; and the service is configured to use the dedicated outputs storage area to write output data into for its respective implementations of those of the commands that produce such output data.

9. The gaming machine system of claim 8 wherein:

two or more of the stored commands each has a respective unique tag associated with it and stored in the storage device; and the dedicated outputs storage area is subdivided into outputs folders each associated a respective one of the unique tags; and the service is configured to use the respective unique tags for selectively drawing respective input data for implementing each of the two or more or more of the stored commands based on its respective unique tag.

10. The gaming machine system of claim 8 wherein:

two or more of the stored commands each has a respective unique tag associated with it and stored in the storage device; and the dedicated outputs storage area is subdivided into output folders each associated a respective one of the unique tags; and the service is configured to use the respective unique tags for selectively writing respective output data for implementing each of the two or more of the stored commands based on its respective unique tag.

11. The gaming machine system of claim 1 wherein:

with launching of the respective programs, the service generates an audit trail of the launched programs and the processes executed by the launched programs; and the service writes the generated audit trail into the inserted storage device.

12. The gaming machine system of claim 11 wherein:

the signaling that the inserted storage device can be removed is not provided until after all audit trails generated by the service are stored in the inserted storage device.

13. The gaming machine system of claim 1 wherein:

the gaming machine controller is a progressive controller that is operatively coupled to a respective plurality of electronic gaming machines that participate in wagering for a corresponding progressive prize and the progressive controller is configured to regulate how the corresponding progressive prize can be won.

14. The gaming machine system of claim 13 wherein:

each of the electronic gaming machines (EMG's) of the respective plurality is securely housed in a respective second or further one of the secured first housings; and power-hit tolerant sensors are provided at each of the first housings for monitoring the respective first entries, detecting unlocking of any of the respective first entries even in the event of a power outage and reporting the unlocking to a security auditing system.

15. The gaming machine system of claim 1, wherein said gaming machine controller comprises a progressive gaming machine controller which is operatively coupled to a plurality of electronic gaming machines and configured to regulate a progressive jackpot that is winnable by way of the plurality of the plurality of electronic gaming machines.

16. The gaming machine system of claim 1, further comprising a plurality of electronic gaming machines.

* * * * *